US012069257B2

(12) United States Patent
Chuang et al.

(10) Patent No.: US 12,069,257 B2
(45) Date of Patent: Aug. 20, 2024

(54) METHODS AND APPARATUSES OF SIGNALING QUANTIZATION PARAMETER IN VIDEO PROCESSING SYSTEM

(71) Applicant: MEDIATEK INC., Hsinchu (TW)

(72) Inventors: Tzu-Der Chuang, Hsinchu (TW); Chih-Wei Hsu, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 773 days.

(21) Appl. No.: 17/265,957

(22) PCT Filed: Aug. 16, 2019

(86) PCT No.: PCT/CN2019/101047
§ 371 (c)(1),
(2) Date: Feb. 4, 2021

(87) PCT Pub. No.: WO2020/035057
PCT Pub. Date: Feb. 20, 2020

(65) Prior Publication Data
US 2021/0321098 A1    Oct. 14, 2021

Related U.S. Application Data

(60) Provisional application No. 62/786,317, filed on Dec. 28, 2018, provisional application No. 62/727,577, (Continued)

(51) Int. Cl.
*H04N 19/119* (2014.01)
*H04N 19/124* (2014.01)
(Continued)

(52) U.S. Cl.
CPC ......... *H04N 19/119* (2014.11); *H04N 19/124* (2014.11); *H04N 19/167* (2014.11);
(Continued)

(58) Field of Classification Search
CPC .................................................... H04N 19/119
See application file for complete search history.

(56) References Cited

U.S. PATENT DOCUMENTS

2012/0114034 A1    5/2012  Huang et al.
2014/0086502 A1    3/2014  Guo et al.
(Continued)

FOREIGN PATENT DOCUMENTS

CN    101742330 B    3/2013
CN    103210647 A    7/2013
(Continued)

OTHER PUBLICATIONS

Non-Final Office Action dated Jan. 7, 2022, issued in U.S. Appl. No. 17/265,967 (copy not provided).
(Continued)

*Primary Examiner* — Jerry T Jean Baptiste
(74) *Attorney, Agent, or Firm* — McClure, Qualey & Rodack, LLP

(57) ABSTRACT

Video data processing methods and apparatuses receive input data associated with a current split node partitioned from a parent node by a splitting type, determine a depth of the current split node according to the splitting type, and compare the depth of the current split node with a maximum delta QP signaling depth. A video decoding system derives a delta QP from one or more syntax elements signaled in a TU associated with the current split node according to the comparing result, reconstructs a final QP for the current split node based on a reference QP and the delta QP, and decodes one or more TUs associated with the current split node using the final QP. The depth is counted in a way considering different splitting types and splitting partitions.

25 Claims, 8 Drawing Sheets

Related U.S. Application Data filed on Sep. 6, 2018, provisional application No. 62/764,872, filed on Aug. 16, 2018.

(51) Int. Cl.
| | | |
|---|---|---|
| *H04N 19/167* | (2014.01) | |
| *H04N 19/176* | (2014.01) | |
| *H04N 19/186* | (2014.01) | |
| *H04N 19/196* | (2014.01) | |
| *H04N 19/70* | (2014.01) | |
| *H04N 19/96* | (2014.01) | |

(52) U.S. Cl.
CPC ......... *H04N 19/176* (2014.11); *H04N 19/186* (2014.11); *H04N 19/196* (2014.11); *H04N 19/70* (2014.11); *H04N 19/96* (2014.11)

(56) References Cited

U.S. PATENT DOCUMENTS

| | | |
|---|---|---|
| 2014/0254677 A1 | 9/2014 | Oh et al. |
| 2015/0117522 A1 | 4/2015 | Sim et al. |
| 2016/0100170 A1 | 4/2016 | Tourapis et al. |
| 2016/0205403 A1* | 7/2016 | Huang ................. H04N 19/174 375/240.03 |
| 2017/0272748 A1 | 9/2017 | Seregin et al. |
| 2018/0020241 A1 | 1/2018 | Li et al. |
| 2018/0103268 A1 | 4/2018 | Huang et al. |
| 2018/0199072 A1 | 7/2018 | Li et al. |
| 2021/0235088 A1 | 7/2021 | Tourapis et al. |

FOREIGN PATENT DOCUMENTS

| | | |
|---|---|---|
| WO | WO2017/165395 A1 | 9/2017 |
| WO | 2017/203930 A1 | 11/2017 |
| WO | 2017/206826 A1 | 12/2017 |
| WO | 2017/219342 A1 | 12/2017 |
| WO | 2018/018486 A1 | 2/2018 |

OTHER PUBLICATIONS

Chinese language office action dated Aug. 25, 2022, issued in application No. CN 201980052560.2.
International Search Report and Written Opinion dated Nov. 8, 2019, issued in application No. PCT/CN2019/101047.
Bross, B., et al.; "Versatile Video Coding (Draft 2);" Joint Video Experts Team (JVET) of ITU-T SG 16 WP 3 and ISO/IEC JTC 1/SC 29/WG 11; Jul. 2018; pp. 1-53.
Chinese language office action dated Sep. 26, 2020, issued in application No. TW 108129244.
International Search Report and Written Opinion dated Nov. 13, 2019, issued in application No. PCT/CN2019/101123.
Chinese language office action dated Jul. 28, 2020, issued in application No. TW 108129254.
Extended European Search Report dated May 13, 2022, issued in application No. EP 19850266.8.
Sole J. et al.; "Non-CCE6: Delta QP signaling for palette;" Joint Collaborative Team on Video Coding (JCT-VC) of ITU-T SG 16 WP 3 and ISO/IEC JTC 1/SC 29/WG 11; Oct. 2014; pp. 1-3.
Extended European Search Report dated May 13, 2022, issued in application No. EP 19849251.4.
Chinese language office action dated Jul. 21, 2022, issued in application No. CN 201980052051.X.

* cited by examiner

MxM        M/2xM        MxM/2       M/2xM/2

M/4xM (L)    M/4xM (R)    MxM/4 (U)    MxM/4 (D)

METHODS AND APPARATUSES OF SIGNALING QUANTIZATION PARAMETER IN VIDEO PROCESSING SYSTEM

CROSS REFERENCE TO RELATED PATENT APPLICATION(S)

The present invention claims priority to U.S. Provisional Patent Application Ser. No. 62/764,872, filed on Aug. 16, 2018, entitled "Methods of signaling quantization parameter for Quad-tree plus multi-type structure", U.S. Provisional Patent Application Ser. No. 62/727,577, filed on Sep. 6, 2018, entitled "Methods of signaling quantization parameter for Quad-tree plus multi-type structure", and U.S. Provisional Patent Application Ser. No. 62/786,317, filed on Dec. 28, 2018, entitled "Methods of signaling quantization parameter for QTMTT". The U.S. Provisional patent applications are hereby incorporated by reference in their entirety.

TECHNICAL FIELD

The present invention relates to video data processing methods and apparatuses for video encoding or video decoding. In particular, the present invention relates to quantization parameter signaling for video data partitioned into square and non-square blocks.

BACKGROUND

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice into multiple Coding Tree Units (CTUs). In the HEVC main profile, the minimum and the maximum sizes of a CTU are specified by syntax elements signaled in the Sequence Parameter Set (SPS) among the sizes of 8×8, 16×16, 32×32, and 64×64. The CTUs in a slice are processed according to a raster scan order. Each CTU is further recursively divided into one or more Coding Units (CUs) according to a quadtree (QT) partitioning method to adapt to various local characteristics. The size of a CTU may be 64×64, 32×32, or 16×16, and each CTU may be a single CU or split into four smaller units of equal sizes M/2×M/2, which are split nodes of the coding tree. If units are leaf nodes of the coding tree, the units become CUs, otherwise, the quadtree splitting process partitions each unit iteratively until the size of a node reaches a minimum allowed CU size specified in the SPS. An example of the quadtree block partitioning structure for a CTU is illustrated in FIG. 1, where the solid lines indicate CU boundaries in CTU 100.

The prediction decision is made at the CU level, where each CU is either coded by inter picture (temporal) prediction or intra picture (spatial) prediction. Since the smallest allowed minimum CU size is 8×8, the minimum granularity for switching different basic prediction types is 8×8. Once the splitting of CU hierarchical tree is done, each CU is subject to further split into one or more Prediction Units (PUs) according to a PU partition type for prediction in HEVC. FIG. 2 shows eight PU partition types defined in the HEVC standard. Each CU is split into one, two, or four PUs according to one of the eight PU partition types shown in FIG. 2. The PU works as a basic representative block for sharing the prediction information as the same prediction process is applied to all pixels in the PU and prediction relevant information is conveying to the decoder on a PU basis.

After obtaining a residual signal generated by the prediction process based on the PU splitting type, data of the residual signal belong to a CU is further split into one or more Transform Units (TUs) according to another QT block partitioning structure for transforming the residual data into transform coefficients for compact data representation. The dotted lines in FIG. 1 indicate TU boundaries. The TU is a basic representative block for applying integer transform and quantization on the residual data. For each TU, one transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional sample array of one color component associated with the CTU, CU, PU, and TU respectively. For example, a CTU consists of one luminance (luma) CTB, two chrominance (chroma) CTBs, and its associated syntax elements. In the HEVC system, the same quadtree block partitioning structure is generally applied to both luma and chroma components unless a minimum size for chroma block is reached.

Binary Tree Partitioning Beside quadtree partitioning, an alternative partitioning method is called Binary Tree (BT) block partitioning, where a block is recursively split into two smaller blocks. A simplest binary tree partitioning method only allows symmetrical horizontal splitting and symmetrical vertical splitting. For a given block of size M×N, a flag is signaled to indicate whether the given block is split into two smaller blocks, if the flag indicates splitting, another syntax element is signaled to indicate which splitting type is used. In the case of horizontal splitting, the given block is split into two blocks of size M×N/2; and in the case of vertical splitting, the given block is split into two blocks of size M/2×N. The BT partitioning method may be used for partitioning a slice into CTU, a CTU into CUs, a CU into PUs, or a CU into TUs. An example of the BT partitioning method split a CTU into CUs, and for simplification, there is no further partitioning from CU to PU or from CU to TU, that is the leaf node of the binary tree is the basic unit for prediction and transform coding.

QTBT Partitioning Although the binary tree partitioning method supports more partition shapes and thus is more flexible than the quadtree partitioning method, the coding complexity and signaling overhead increase for selecting the best partition shape among all possible partition shapes. A combined partitioning method called Quad-Tree-Binary-Tree (QTBT) structure combines a quadtree partitioning method with a binary tree partitioning method, which balances the coding efficiency and the coding complexity of the two partitioning methods. An exemplary QTBT structure is shown in FIG. 3A, where a large block such as a CTU is firstly partitioned by a quadtree partitioning method then a binary tree partitioning method. QT splitting is iteratively performed until the size of a splitting block reaches a minimum allowed quadtree leaf node size, and if a leaf quadtree block is not larger than a maximum allowed binary tree root node size, the leaf quadtree block can be further partitioned by BT splitting. BT splitting is iteratively performed until the size, width, or height of a splitting block reaches a minimum allowed binary tree leaf node size, width, or height, or a binary tree depth reaches a maximum allowed binary tree depth. FIG. 3A illustrates an example of block partitioning structure according to the QTBT partitioning method and FIG. 3B illustrates a coding tree diagram for the QTBT block partitioning structure shown in FIG. 3A. The solid lines in FIGS. 3A and 3B indicate quadtree splitting while the dotted lines indicate binary tree splitting. In each splitting (i.e., non-leaf) node of the binary tree structure, one flag indicates which splitting type (symmetric horizontal splitting or symmetric vertical splitting) is used, 0 indicates horizontal splitting and 1 indicates vertical splitting. It is possible to simplify the partitioning process by omitting the splitting from CU to PU and from CU to TU, as the leaf nodes of a binary tree block partitioning structure is the basic representative block for both prediction and transform coding. For example, the QTBT structure shown in FIG. 3A splits the large block into multiple smaller blocks, and these smaller blocks are processed by prediction and transform coding without further splitting.

A specific example of the QTBT structure applied to split a CTU with a size of 128×128 into multiple CUs, where a minimum allowed quadtree leaf node size is equal to 16×16, a maximum allowed binary tree root node size is equal to 64×64, a minimum allowed binary tree leaf node width and height are both equal to 4, and a maximum allowed binary tree depth is equal to 4. The CTU is first split by a quadtree partitioning structure and a leaf quadtree unit has a size ranged from 16×16 to 128×128, and if the leaf quadtree unit is 128×128, it cannot be further split by binary tree splitting because the size exceeds the maximum allowed binary tree root node size 64×64, otherwise the leaf quadtree unit may be further partitioned by binary tree splitting. The leaf quadtree unit is also the root binary tree unit, which has a binary tree depth of 0. When the binary tree depth reach 4, which is the maximum allowed binary tree depth, no splitting is implicitly determined, when the binary tree node has a width equal to 4, no horizontal splitting is implicitly determined, and when the binary tree node has a height equal to 4, no vertical splitting is implicitly determined. The leaf nodes of the QTBT structure are further processed by prediction and transform coding.

The QTBT structure is applied separately to luma and chroma components in Intra (I) slices, and is applied simultaneously to both the luma and chroma components in both Predictive (P) and Bi-predictive (B) slices, except when a certain minimum sizes are reached for the chroma components. In I slices, each luma CTB has its QTBT-structured block partitioning whereas the two corresponding chroma CTBs have another QTBT-structure block partitioning according to one embodiment. In another embodiment, the two corresponding chroma CTBs can also have their own QTBT-structure block partitioning.

Ternary Tree Partitioning Another more flexible partitioning method called Ternary Tree (TT) partitioning method is introduced to capture objects which locate in the block center while quadtree partitioning method and binary tree partitioning method always split along the block center. FIG. 4 illustrates vertical ternary tree partitioning 42 and horizontal ternary tree partitioning 44. The ternary tree partitioning method may provide capability to faster localize small objects along block boundaries, by allowing one-quarter partitioning vertically or horizontally.

MTT Partitioning Multi-Type-Tree (MTT) block partitioning extends the concept of the two-level tree structure in QTBT by allowing both the binary tree and ternary tree partitioning methods in the second level of MTT. The two levels of trees in MTT are called Region Tree (RT) and Prediction Tree (PT) respectively. An example of MTT is QuadTree plus Multi-Tree (QTMT), as the first level RT is always QT partitioning, and the second level PT may be either BT partitioning or TT partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached, for example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic Coding Unit (CU) for prediction and transform processing and will not be further split.

FIG. 5 illustrates an example of tree-type signaling for block partitioning according to MTT block partitioning. RT signaling may be similar to the quadtree signaling in QTBT block partitioning. For signaling a PT node, one additional bin is signaled to indicate whether it is a binary tree partitioning or ternary tree partitioning. For a block split by RT, a first bin is signaled to indicate whether there is another RT split, if the block is not further split by RT (i.e. the first bin is 0), a second bin is signaled to indicate whether there is a PT split. If the block is also not further split by PT (i.e. the second bin is 0), then this block is a leaf node. If the block is then split by PT (i.e. the second bin is 1), a third bin is sent to indicate horizontal or vertical partitioning followed by a fourth bin for distinguishing BT or TT partitioning.

After splitting the video data into MTT block partitions, MTT leaf nodes are CUs used for prediction and transform coding. Similar to QTBT, the MTT tree structure is coded separately for luma and chroma components in I slices, and the MTT tree structure is applied simultaneously to both the luma and chroma components in P and B slices except for the cases when certain minimum sizes are reached for the chroma component. In other words, a luma CTB has its MTT-structure block partitioning while two corresponding chroma CTBs have another MTT-structure block partitioning. The term QTBT may be referred to as QT splitting plus BT splitting or QT splitting plus BT and TT splitting in the following descriptions.

Delta QP Signaling in HEVC In HEVC, a quantization parameter (QP) is determined by a reference QP and a delta QP when adaptive QP or multi-QP optimization is enabled. The delta QP is transmitted instead of the QP in order to reduce the bit rate required for QP information. A Coding Block (CB) larger than or equal to a minimum size for delta QP signaling has its own delta QP, whereas a CB smaller than the minimum size shares a delta QP with one or more other CBs. A single CB having its own delta QP or a number of CBs sharing the same delta QP is referred to as a Quantization Group (QG) or quantization unit.

Delta QP signaling for the luma component is controlled by two flags, an enable flag cu_qp_delta_enabled_flag and a depth flag diff_cu_qp_delta_depth. The enable flag, cu_qp_delta_enabled_flag, is used to indicate delta QP signaling is enabled or disabled, and the depth flag, diff_cu_qp_delta_depth, is used to set the minimum size for delta QP signaling. The enable flag may be signaled in a sequence, picture, slice, tile, CTU-row level. The depth flag diff_cu_qp_delta_depth is presented in a high level syntax, for example in the PPS, and cu_qp_delta_abs may be present in the transform unit syntax when the enable flag cu_qp_delta_enabled_flag is equal to 1. The enable flag cu_qp_delta_enabled_flag equal to 0 specifies that the depth flag diff_cu_qp_delta_depth is not present in the PPS and that cu_qp_delta_abs is not present in the transform unit syntax. The depth flag diff_cu_qp_delta_depth specifies a difference in depth between a luma CTB size and a minimum luma CB size of coding units that convey cu_qp_delta_abs and cu_qp_delta_sign_flag. The value of the depth flag diff_cu_qp_delta_depth is in the range of 0 to log 2_diff_max_min_luma_coding_block_size, inclusive, and the value of the depth flag is inferred to be equal to 0 when this depth flag is not present. log 2_diff_max_min_luma_coding_block_size specifies a difference between a maximum luma CB size and a minimum luma CB size. A variable, Log 2MinCuQpDeltaSize, is derived from the depth flag as follows:

Log 2MinCuQpDeltaSize=Ctb Log 2SizeY-diff_cu_qp_delta_depth

The syntax of signaling a delta QP at TU level is as follows:

```
if ( cu_qp_delta_enabled_flag && !IsCuQpDeltaCoded ) {
    cu_qp_delta_abs
    if ( cu_qp_delta_abs )
        cu_qp_delta_sign_flag
}
``` where IsCuQpDeltaCoded is set to 0 when encoding or decoding a CU as following.

```
if( cu_qp_delta_enabled_flag && log2CbSize >=
Log2MinCuQpDeltaSize ) {
    IsCuQpDeltaCoded = 0
    CuQpDeltaVal = 0
}
``` where log 2CbSize is the log 2 of a split node size.

When delta QP is applied, a final QP for a coding block is derived based on the signaled delta QP and a reference QP. The reference QP of a current quantization group is derived from QPs of left and above neighboring coded quantization groups (qP_A and qP_L), where the reference QP is an average of the two QPs, (qP_L+qP_A+1)>>1. If any one of the left and above neighboring coded quantization group is unavailable, the unavailable QP is replaced by a previous QP of a previous coded quantization group in the decoding order. A default QP such as the slice QP is used as the previous QP if the previous coded quantization group is unavailable.

In HEVC, chroma QP offset signaling is controlled by two flags, a chroma enable flag cu_chroma_qp_offset_enabled_flag and a size flag Log 2MinCuChromaQpOffsetSize. The former indicates whether chroma QP offset signaling is enabled or disabled, the latter is used to set a minimum size of units in chroma QP offset signaling. If the chroma enable flag cu_chroma_qp_offset_enabled_flag is equal to 1, then a flag cu_chroma_qp_offset_flag is present to specify that whether a chroma QP offset is used for a block. The size flag Log 2MinCuChromaQpOffsetSize is derived as:

Log 2MinCuChromaQpOffsetSize=Ctb Log 2SizeY-diff_cu_chroma_qp_offset_depth where diff_cu_chroma_qp_offset_depth specifies a difference between a chroma CTB size and a minimum chroma CB size of coding units that convey the flag cu_chroma_qp_offset_flag. The syntax of signaling the chroma QP offset at the TU level is as follows:

```
if ( cu_chroma_qp_offset_enabled_flag && cbfChroma
    && !cu_transquant_bypass && !IsCuChromaQpOffsetCoded ) {
    cu_chroma_qp_offset_flag
    if (cu_chroma_qp_offset_flag )
        cu_chroma_qp_offset_idx
}
``` where IsCuChromaQpOffsetCoded is set to 0 when encoding or decoding a CU as follows.

```
If ( cu_chroma_qp_offset_enabled_flag
    && log2CbSize >= Log2MinCuChromaQpOffsetSize ) {
    IsCuChromaQpOffsetCoded = 0
}
```

The shape of the CBs in HEVC is always square, so a block size can be directly represented by one dimensional value, such as one of the block width and block height. The sizes are precisely derived by depths of quadtree splitting in HEVC. However, there are also non-square CBs resulted in the QTBT or MTT splitting structure, signaling a delta QP and chroma QP offset and deriving a reference QP for the non-square CBs may be an issue. Moreover, luma and chroma components may be separately coded in different CU splitting structures so there are two independent QTBT CU splitting structures for the luma and chroma components. Signaling of the delta QP and chroma QP offset when separate CU splitting structures are used for the luma and chroma components may be another issue.

SUMMARY

Methods and apparatuses of processing video data in a video decoding system receive input data associated with a current split node partitioned from a parent node by a splitting type, determine a depth of the current split node according to the splitting type, determine a value of a variable by comparing the depth of the current split node with a maximum delta QP signaling depth. The methods and apparatuses further derive a delta QP from one or more syntax elements signaled or parsed in a TU associated with the current split node according to the value of the variable, reconstruct a final QP for one or more TUs associated with the current split node based on a reference QP and the delta QP if the syntax elements are signaled for the current split node, and decode the one or more TUs associated with the current split node using the final QP. Corresponding methods and apparatuses of processing video data in a video encoding system receive input data associated with a current split node partitioned from a parent node by a splitting type, determine a depth of the current split node according to the splitting type, and determine a QP for the current split node according to a comparing result of the depth of the current split node and a maximum delta QP signaling depth. Based on the comparing result, the method and apparatuses further derive a delta QP from the QP for the current split node and a reference QP and signal one or more syntax elements of the delta QP in a TU associated with the current split node. The QP is used in encoding one or more TUs in the current split node. In some embodiments of the encoding methods, the step of deriving and signaling a delta QP is performed if the comparing result indicates the depth of the current split node is smaller than or equal to the maximum delta QP signaling depth and there is at least one non-zero coefficient or at least one escape palette in the current split node.

The video data is partitioned into square and non-square leaf CUs according to a CU partitioning structure such as QTBT or MTT. Some embodiments of delta QP signaling determine the depth of the current split node, and the maximum delta QP signaling depth is derived by a minimum delta QP signaling CU area. The maximum delta QP signaling depth is predefined, derived, or signaled in one or a combination of a slice, picture, tile, and sequence level. In one example, the current split node is a leaf CU, and the delta QP is derived from the syntax elements at a decoder or the step of deriving and signaling a delta QP is performed by an encoder when the area of the current split node is larger than or equal to the minimum delta QP signaling CU area and there is at least one non-zero coefficient or at least one escape palette in the current split node. In another example, the current split node is not a leaf CU and is further partitioned into multiple leaf CUs, the delta QP is derived from the syntax elements at a decoder or the step of deriving and signaling a delta QP is performed by an encoder if the current split node has an area larger than or equal to the minimum delta QP signaling CU area, an area of at least one children node partitioned form the current split node is smaller than the minimum delta QP signaling CU area, and at least one of the leaf CUs in the current split node has at least one non-zero coefficient or at least one escape palette. The delta QP in this example is used by one or more of the leaf CUs within the current split node.

In one embodiment when the current split node is a leaf CU, the delta QP is derived from the syntax elements at a decoder or the step of deriving and signaling a delta QP is performed by an encoder if the depth of the current split node is smaller than or equal to the maximum delta QP signaling depth and the current split node has at least one non-zero coefficient or at least one escape palette. In another embodiment when the current split node is not a leaf CU and is further partitioned into multiple leaf CUs, the delta QP is derived from the one or more syntax elements at a decoder or the step of deriving and signaling a delta QP is performed by an encoder if the depth of the current split node is smaller than or equal to the maximum delta QP signaling depth, a depth of at least one children node partitioned form the current split node is larger than the maximum delta QP signaling depth, and at least one of the leaf CUs in the current split node has at least one non-zero coefficient or at least one escape palette. The delta QP is used by one or more of the leaf CUs within the current split node in this example. An example of the depth of the current split node is derived by a quadtree depth and a Mulit-Type Tree (MTT) depth. For example, the depth of the current split node is derived by multiplying the quadtree depth by L plus the MTT depth, where L is a predefined integer. In another example, the depth of the current split node is counted by a multiple-tree depth (MTDepth), where the MTDepth represents an area of the current split node by considering different splitting types and split nodes. In one embodiment, the depth of the current split node is a depth of the parent node plus 2 when the parent node is partitioned by QT splitting, and the depth of the current split node is a depth of the parent node plus 1 when the parent node is partitioned by BT splitting. If the parent node is partitioned by TT splitting, a depth of a first or third node is a depth of the parent node plus 2 and a depth of a second node is the depth of the parent node plus 1. In one embodiment, the maximum delta QP signaling depth is signaled separately for luma and chroma components when separate CU partitioning structures are employed for partitioning the video data of the luma and chroma components. In another embodiment where the current split node is partitioned into multiple children nodes, a depth of a children node is the depth of the current split node plus 2 if the children node is a first or third split node of TT splitting, a depth of the children node is the depth of the current split node plus 1 if the children node is a second split node of TT splitting, a depth of a children node is the depth of the current split node plus 1 if the children node is partitioned from the current split node by BT splitting, and a depth of a children node is the depth of the current split node plus 2 if the children node is partitioned from the current split node by quadtree splitting.

In an embodiment of QP signaling depending on depth, when the current split node is a first or third split node partitioned from the parent node by TT splitting and the depth of the current split node is smaller than the maximum delta QP signaling depth, and a depth of a second split node partitioned from the same parent node is equal to the maximum delta QP signaling depth, the final QP derived from the delta QP is shared by one or more of the three split nodes partitioned from the parent node.

In some embodiments, beside the depth of the current split node, whether to signal syntax elements of a delta QP for the current split node is determined from addition information, for example, a flag indicating if the current split node is a first or third split node in TT splitting, a flag indicating if the current split node is a second split node in TT splitting, or a parent CU size of the current split node. One or more delta QP related information may be passed from the parent node to the current split node to determine whether to signal syntax elements of a delta QP for the current split node. For example, the parent node determines a reset flag for the current split node by referring to the area, size or depth of the current split node or the splitting type for partitioning the parent node, and the reset flag is passed to the current split node to determine the value of the variable for the current split node.

In an embodiment of a special case, at most one delta QP is derived or signaled for one or more children nodes partitioned from the current split node by TT splitting if the depth of the current split node is smaller than the maximum delta QP signaling depth and a depth of at least one children node partitioned from the current split node is larger than the maximum delta QP signaling depth. The delta QP derived from or signaled by the one or more syntax elements is shared by one or more of the children nodes partitioned form the current split node in this embodiment. The depth of the current split node and the depth of the children node partitioned from the current split node may be derived by areas.

In some embodiments of the QP signaling depending on depth, the reference QP is always a slice QP when the CU partitioning structure is a QTBT or MTT partitioning structure.

Aspects of the disclosure further provide an apparatus for a video decoding system decoding video data of a current split node according to a final QP derived from a delta QP, and the delta QP is derived from one or more syntax elements signaled or parsed in a TU associated with the current split node with a depth smaller than or equal to a maximum delta QP signaling depth. The disclosure also provides an apparatus for a video encoding system encoding a current split node using a QP determined according to a comparing result of a depth of the current split node and a maximum delta QP signal depth, and deriving a delta QP from the QP and a reference QP then signals one or more syntax elements of the delta QP in a TU associated with the current split node.

Aspects of the disclosure further provide a non-transitory computer readable medium storing program instructions for causing a processing circuit of an apparatus to perform video decoding process to derive a delta QP for a current split node from syntax elements signaled in a TU according to a depth of the current split node. The disclosure also provides a non-transitory computer readable medium storing program instructions for causing a processing circuit of an apparatus to perform video encoding process to signal a delta QP for a current split node according to a depth of the current split node. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF PREFERRED IMPLEMENTATIONS

Figure 1:
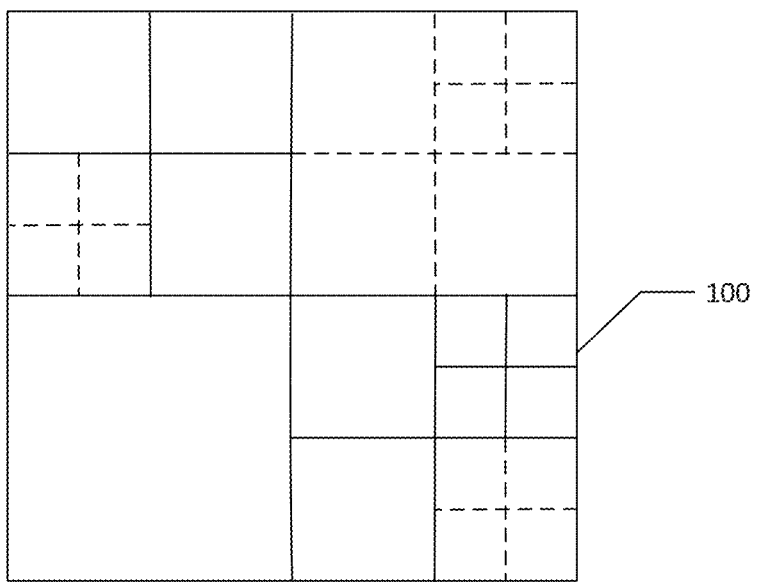
FIG. 1 illustrates an exemplary coding tree for splitting a Coding Tree Unit (CTU) into Coding Units (CUs) and splitting each CU into one or more Transform Units (TUs) according to the HEVC standard.
Figure 2:
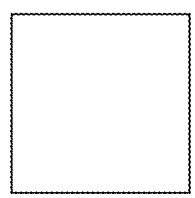
FIG. 2 illustrates eight different Prediction Unit (PU) partition types splitting a CU into one or more PUs according to the HEVC standard.
Figure 2:
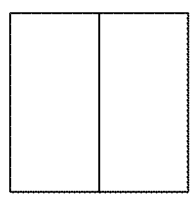
Figure 2:
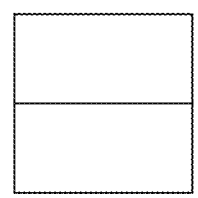
Figure 2:
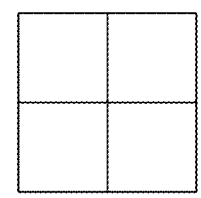
Figure 2:
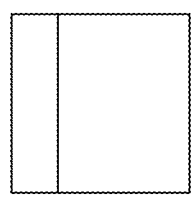
Figure 2:
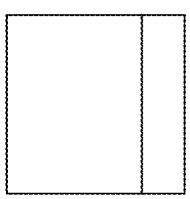
Figure 2:
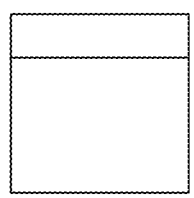
Figure 2:
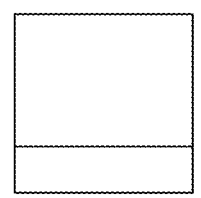
Figure 3A:
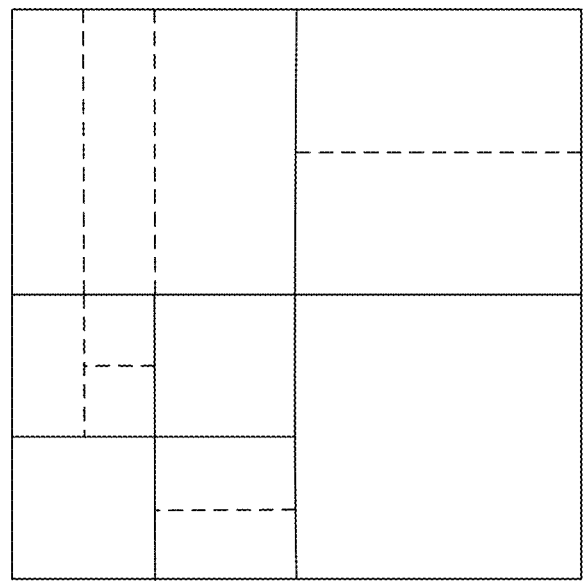
FIG. 3A illustrates an exemplary block partitioning structure of a Quad-Tree-Binary-Tree (QTBT) partitioning method.
Figure 3B:
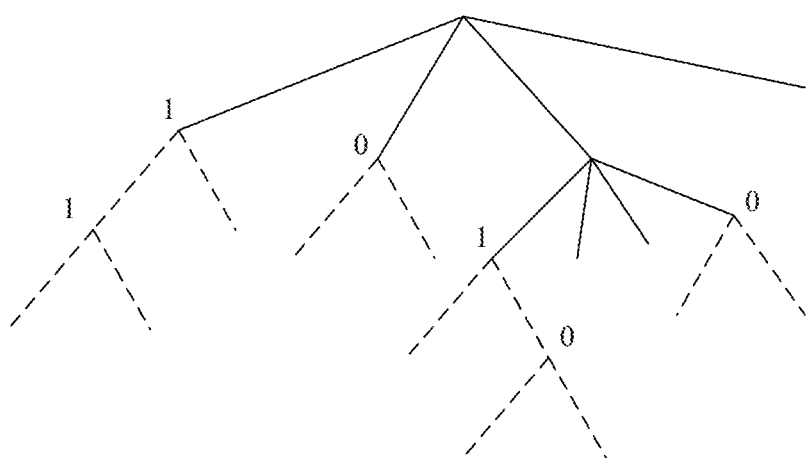
FIG. 3B illustrates a coding tree structure corresponding to the block partitioning structure of FIG. 3A.
Figure 4:
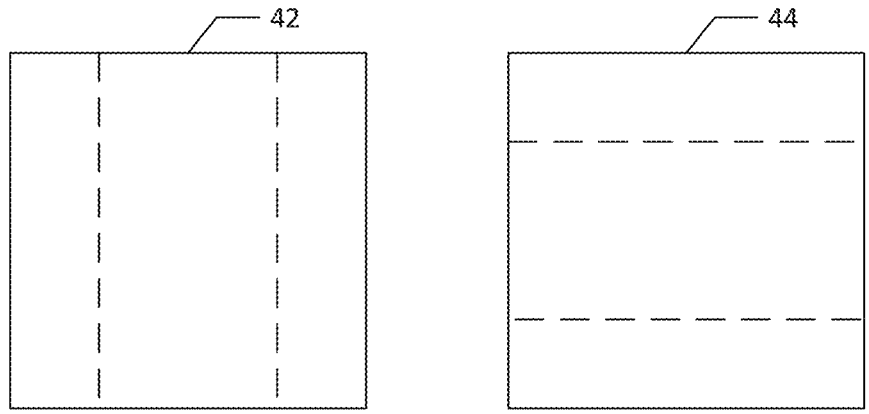
FIG. 4 illustrates vertical ternary tree splitting and horizontal ternary tree splitting.
Figure 5:
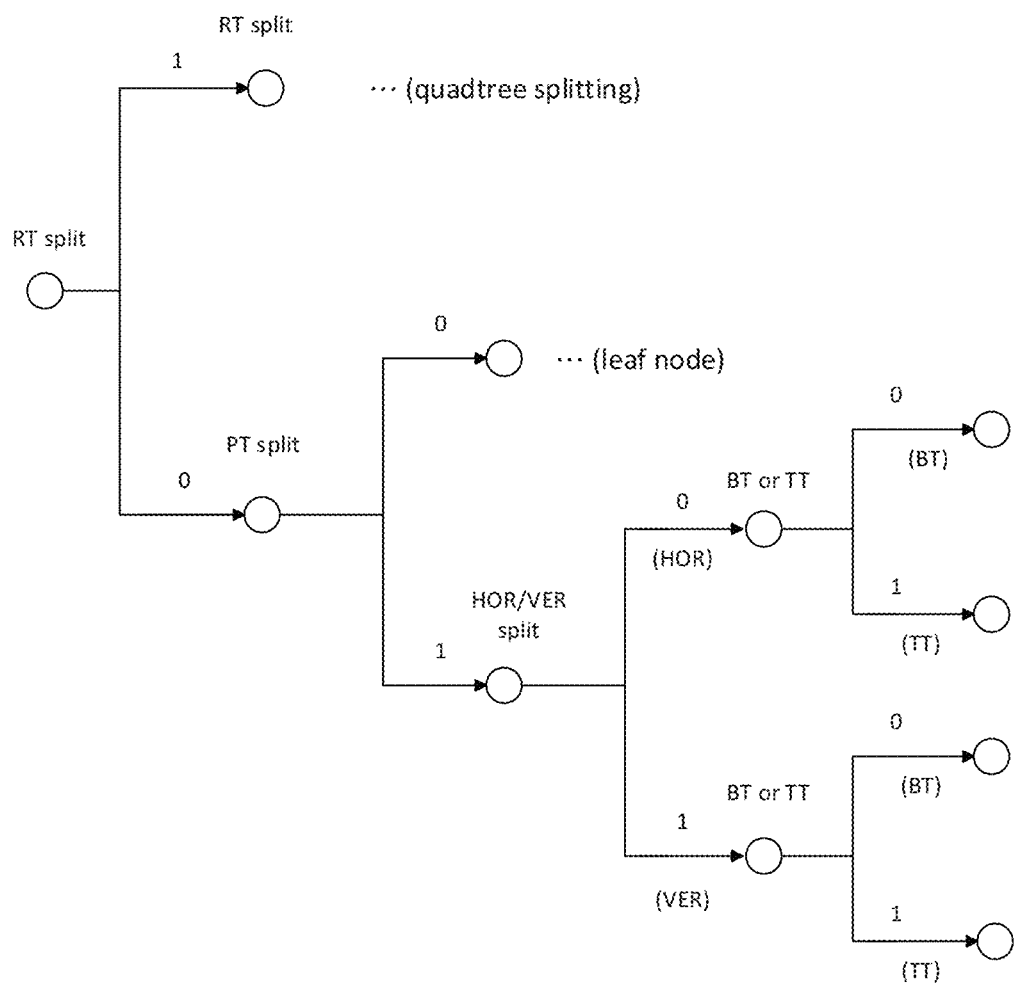
FIG. 5 illustrates an example of tree-type signaling for MTT partitioning.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Embodiments of the present invention illustrate various different QP determining and signaling methods when QTBT or MTT (for example QTMT) partitioning structure is used for block partitioning.

Delta QP Signaling Depends on Area for QTBT or MTT Partitioning The QTBT or MTT partitioning structure generates square Coding Blocks (CBs) as well as rectangular CBs, therefore delta QP signaling cannot only be conditioned by the block size measured in one dimension as in HEVC. Some embodiments of the present invention therefore determine whether to signal a delta QP depending on a two dimensional area of a split node or depending on a depth representing the area of the split node. A minimum delta QP signaling CU area or a maximum delta QP signaling depth for controlling delta QP signaling is predefined, derived, or signaled in a slice-level, picture-level, tile-level, and/or sequence-level, such that a decoder may be able to determined, derived, or parse such minimum delta QP signaling CU area or maximum delta QP signaling depth in a slice-level, picture-level, tile-level, and/or sequence-level. If utilizing of delta QPs is enabled, a delta QP is signaled for a leaf CU with an area larger than or equal to the minimum delta QP signaling CU area when there is at least one non-zero coefficient or at least one escape palette in this leaf CU, such that a decoder can parse and decode this delta QP. The QP is only calculated for performing inverse quantization on the non-zero coefficients or escape palettes, thus reconstruction of QP is not required if all the coefficients are zero or there is no escape palette. For a current split node that is not a leaf CU with a size equal to the minimum delta QP signaling CU area, at most one delta QP is signaled and shared by all leaf CUs in the current split node, and this delta QP is used by one or more of the leaf CUs in the current split node. If one of the leaf CUs in the current split node has at least one non-zero coefficient or at least one escape palette, a delta QP is signaled for all the leaf CUs, otherwise, the delta QP is not signaled for the current split node. The signaled delta QP is then shared by all the leaf CUs within the current split node and a final QP derived from the delta QP is used by one or more leaf CUs within the current split node. For example, a current split node is partitioned into four leaf CUs A, B, C, and D, where the coding order is CU A, CU B, CU C, and then CU D, and only CU C has non-zero coefficients. A delta QP is signaled and shared for all leaf CUs in the current split node, however, a final QP derived from the delta QP and a reference QP is only applied for CUs C and D in this example. The reference QP is used for CUs A and B. A delta QP may be signaled after a first coded block flag (cbf) equal to a first value or after a first escape palette flag equal to a second value. The first value specifies the leaf CU has at least one non-zero coefficient, and the second value specifies the leaf CU has at least one escape palette. A delta QP is signaled by transmitting or including one or more syntax elements in a video bitstream at a video encoder, and the signaled delta QP is derived by parsing the one or more syntax elements from the video bitstream.

A variable IsCuQpDeltaCoded is used to indicate whether a delta QP is already coded or needed to be signaled. A variable representing the minimum delta QP signaling CU area, MinCuQpDeltaArea, is used to determine a value of the variable, IsCuQpDeltaCoded, as follows:

```
if( cu_qp_delta_enabled_flag && CbWidth *
CbHeight >= MinCuQpDeltaArea ) {
    IsCuQpDeltaCoded = 0
    CuQpDeltaVal = 0
}
``` where CbWidth and CbHeight represent the block width and block height of a split node, respectively. As previously described, IsCuQpDeltaCoded indicates whether a delta QP is already coded for this split node, where IsCuQpDeltaCoded=0 suggests a delta QP shall be signal for this split node as it is not yet coded. The variable IsCuQpDeltaCoded=1 suggests a delta QP is already coded so a new delta QP is not signaled for this split node. A final QP for one or more TUs associated with a split node is derived by a delta QP and a reference QP if the delta QP is signaled and a final QP is derived from a previous coded QP if a delta QP is not signaled. According to another embodiment, the above variable MinCuQpDeltaArea is replaced by a log 2 value of the minimum delta QP signaling CU area, Log 2MinCuQpDeltaArea, and the variable, IsCuQpDeltaCoded, is set to 0 if the sum of log 2 values of a block width and block height is larger than or equal to Log 2MinCuQpDeltaArea. This may be described by the following pseudo codes.

```
if( cu_qp_delta_enabled_flag && (Log2CbWidth +
Log2CbHeight) >= Log2MinCuQpDeltaArea) {
    IsCuQpDeltaCoded = 0
    CuQpDeltaVal = 0
}
``` where Log 2CbWidth and Log 2CbHeight are the log 2 values of the block width and block height of a split node in QTBT, respectively. An embodiment of deriving the variable Log 2MinCuQpDeltaArea is shown in the following Equation:

Log 2MinCuQpDeltaArea=2*(*Ctb* Log 2Size*Y*−diff_*cu_qp*_delta_depth).

In some other embodiments, the variable Log 2MinCuQpDeltaArea is also used to determine whether the variable IsCuQpDeltaCoded is set to 0, but instead of comparing with the sum of the log 2 values of the block width and block height, a minimum, maximum, or average of the log 2 values of the block width and block height is compared with the variable Log 2MinCuQpDeltaArea. These embodiments of determining the value of IsCuQpDeltaCoded may be demonstrated by the following pseudo codes.

```
if ( cu_qp_delta_enabledflag
    && min( Log2CbWidth, Log2CbHeight ) >=
    Log2MinCuQpDeltaSize ) {
        IsCuQpDeltaCoded = 0
        CuQpDeltaVal = 0
}; or
if( cu_qp_delta_enabled_flag
    && max( Log2CbWidth, Log2CbHeight) >=
    Log2MinCuQpDeltaSize ) {
        IsCuQpDeltaCoded = 0
        CuQpDeltaVal = 0
}; or
if( cu_qp_delta_enabled_flag
    && avg( Log2CbWidth, Log2CbHeight) >=
    Log2MinCuQpDeltaSize ) {
        IsCuQpDeltaCoded = 0
        CuQpDeltaVal = 0
}
```

An example of determining delta QP signaling based on a block area of a split node is shown by the syntax table of Table 1.

TABLE 1

| | Descriptor |
|---|---|
| Coding_quadtree( x0, y0, log2CbSize, cqtDepth, treeType) { <br>   if( ( ( ( x0 + ( 1 << log2CbSize ) <= pic_width_in_luma_samples <br> ) ? 1 : 0 ) + <br>     ( ( y0 + ( 1 << log2CbSize ) <= pic_height_in_luma_samples <br> ) ? 1 : 0 ) + <br>     ( ( ( 1 << log2CbSize ) <= MaxBtSizeY ) ? 1 : 0 ) ) >= 2 && <br>   log2CbSize > MinQtLog2SizeY ) <br>     qt_split_cu_flag[ x0 ][ y0 ] <br>   if (cu_qp_delta_enabled_flag && ( 1 << (log2CbSize*2) ) > = <br> MinCuQpDeltaArea) { <br>     IsCuQpDeltaCoded = 0 <br>     CuQpDeltaVal = 0 <br>   } <br>   if( qt_split_cu_flag[ x0 ][ y0 ] ) { <br>     x1 = x0 + ( 1 << ( log2CbSize − 1 ) ) <br>     y1 = y0 + ( 1 << ( log2CbSize − 1 ) ) <br>     coding_quadtree( x0, y0, log2CbSize − 1, cqtDepth + 1, treeType) <br>     if( x1 < pic_width_in_luma_samples ) <br>       coding_quadtree( x1, y0, log2CbSize − 1, cqtDepth + | ae(v) |

TABLE 1-continued

Descriptor

```
                1, treeType)
            if( y1 < pic_height_in_luma_samples )
                coding_quadtree( x0, y1, log2CbSize − 1, cqtDepth +
            1, treeType )
            if( x1 < pic_width_in_luma_samples && y1 <
pic_height_in_luma_samples )
                coding_quadtree( x1, y1, log2CbSize − 1, cqtDepth +
            1, treeType )
        } else
    multi_type_tree( x0, y0, 1 << log2CbSize, 1 << log2CbSize, 0, 0, 0, treeTy
pe)
    }
    multi_type_tree( x0, y0, cbWidth, cbHeight, mttDepth, depthOffset,
    partId
x, treeType) {
        if( ( allowSplitBtVer | | allowSplitBtHor | | allowSplitTtVer | |
allowSplitTtHor ) &&
        ( x0 + cbWidth <= pic_width_in_luma_samples ) &&
        (y0 + cbHeight <= pic_height_in_luma_samples ) )
            mtt_split_cu_flag                                               ae(v)
        if (cu_qp_delta_enabled_flag && cbWidth*cbHeight > =
MinCuQpDeltaArea ) {
            IsCuQpDeltaCoded = 0
            CuQpDeltaVal = 0
        }
```

The syntax of signaling delta QP at TU level may be similar to the syntax used in HEVC and shown in the following, where an absolute variable cu_qp_delta_abs and a sign flag cu_qp_delta_sign_flag are signaled when delta QP is enabled and the variable IsCuQpDeltaCoded is set to 0.

```
if ( cu_qp_delta_enabled_flag && !IsCuQpDeltaCoded ) {
    cu_qp_delta_abs
    if( cu_qp_delta_abs )
        cu_qp_delta_sign_flag
}
```

A variable CuQpDeltaVal represents the value of a delta QP, which is derived based on the absolute variable cu_qp_delta_abs and the sign flag cu_qp_delta_sign_flag. A final QP is reconstructed according to a reference QP and this delta QP CuQpDeltaVal. The sign flag cu_qp_delta_sign_flag is inferred to be equal to 0 if it is not present. When cu_qp_delta_abs is present, the variable IsCuQpDeltaCoded is set to 1 and the value of the delta QP CuQpDeltaVal is derived as follows:

$IsCuQpDeltaCoded=1$ $CuQpDeltaVal=cu\_qp\_delta\_abs*(1-2*cu\_qp\_delta\_sign\_flag)$ The functions of signaling and computing a delta QP for a TU are called when the TU has at least one non-zero coefficient. An example of signaling a delta QP when there is at least one non-zero coefficient in a luma or chroma TB is demonstrated by the syntax tables shown in Table 2.

TABLE 2

Descriptor

```
transform_unit( x0, y0, tbWidth, tbHeight, treeType ) {
    if( treeType == SINGLE_TREE | | treeType ==
    DUAL_TREE_LUMA
)
        tu_cbf_luma[ x0 ][ y0 ]                                             ae(v)
    if( treeType == SINGLE_TREE | | treeType ==
DUAL_TREE_CHROMA ) {
        tu_cbf_cb[ x0 ][ y0 ]                                               ae(v)
        tu_cbf_cr[ x0 ][ y0 ]                                               ae(v)
    }
    if(tu_ebf_luma[ x0 ][ y0 ] | | tu_cbf_cb[ x0 ][ y0 ] ||
    tu_cbf_cr[ x0 ][ y0 ])
        delta_qp( )
    delta_qp( ) {
        if( cu_qp_delta_enabled_flag && !IsCuQpDeltaCoded ) {
            cu_qp_delta_abs                                                 ae(v)
            if( cu_qp_delta_abs )
                cu_qp_delta_sign_flag                                       ae(v)
        }
    }
```

Representing Area by Depth The depth flag diff_cu_qp_delta_depth used in HEVC for defining a minimum size for delta QP signaling only considers one-dimensional size of the split node as the block width and block height of any split node in HEVC are always the same. Embodiments of the present invention also use one or more depth value to define a minimum area for delta QP signaling, but the proposed depth value(s) reflects two-dimensional sizes of split nodes by considering the splitting type. Some embodiments signal a delta QP conditioned by an area of the split node represented by a quadtree depth and a MTT depth of the split node. A minimum delta QP signaling CU area is derived by a maximum delta QP signaling depth, diff_cu_qp_delta_depth, in these embodiments, where diff_cu_qp_delta_depth, is predefined, derived, or signaled in slice-level, picture-level, tile-level, and/or sequence-level. In one embodiment, the maximum delta QP signaling depth must be an even number. In one example, the maximum delta QP signaling depth is derived by: diff_cu_qp_delta_depth=diff_cu_qp_delta_depth_div 2<<1, where diff_cu_qp_delta_depth_div 2 is signaled in a slice-level, picture-level, tile-level, CTU-row-level, and/or sequence-level. If delta QP is enabled, for a leaf CU with a depth smaller than or equal to the maximum delta QP signaling depth and the leaf CU has at least one non-zero coefficient or at least one escape palette, a delta QP is signaled for this leaf CU. For a split node not a leaf CU with a depth smaller than or equal to the maximum delta QP signaling depth and a depth of at least one children node partitioned from the split node is larger than the maximum delta QP signaling depth, at most one delta QP is signaled in this split node. The split node is further partitioned into multiple leaf CUs, and a delta QP is signaled if one of the leaf CUs in this split node has at least one non-zero coefficient or at least one escape palette. The signaled delta QP is shared by all the leaf CUs within the split node and a final QP derived by the delta QP is used by one or more of the leaf CUs in the split node. The delta QP may be signaled after a first cbf equal to a first value or after a first escape palette flag equal to a second value, where the first value specifies a CU has at least one non-zero coefficient, and the second value specifies a CU has at least one escape palette.

Similar to the previous embodiments of comparing a combination of the block width and block height with the minimum delta QP signaling CU area, in some embodiments, the variable IsCuQpDeltaCoded is set to 0 by comparing a combination of the quadtree depth and MTT depth with the maximum delta QP signaling depth. In one embodiment, the combination of the quadtree depth and MTT depth is computed by multiplying the quadtree depth by 2 plus the MTT depth, and the variable IsCuQpDeltaCoded is set to 0 during encoding or decoding a CU according to the following pseudo codes:

```
if( cu_qp_delta_enabled_flag &&
  ( (2*quadTreeDepth + MTTDepth) <= diff_cu_qp_delta_depth) {
    IsCuQpDeltaCoded = 0
    CuQpDeltaVal = 0
}
```

The above exemplary combination of the quadtree depth and MTT depth may be generalized as multiplying the quadtree depth by L plus the MTT depth, where L is a predefined integer, for example, L=2 or L=1. In some other embodiments, the combination of the quadtree depth and MTT depth is quadTreeDepth+(MTTDepth>>1) or quadTreeDepth+(MTTDepth+K)>>N, where K and N are predefined integers. For example, K=2 and N=1, K=0 and N=0, or K=1 and N=1.

In some embodiments, a variable called AreaDepth is derived from the quadtree depth and/or MTTDepth. The variable AreaDpeth is derived as AreaDepth=J*quadTreeDepth+((MTTDepth+K)>>N) or AreaDepth=(L*quadTreeDepth+MTTDepth), where J, K, N, and L can be any integers. This variable AreaDpeth may replace the product of the block width and block height (cbWidth*cbHeight) in the previously described embodiments, and the variable representing the minimum delta QP signaling CU area MinCuQpDeltaArea may be replaced by a corresponding depth value MinCuQpDeltaAreaDepth. MinCuQpDeltaAreaDepth is signaled in slice, picture, sequence, CTU-row, or tile-level, which represents an area, area ration, depth, or log 2 area of MinCuQpDeltaArea or a value of the area, area-ratio, depth, or log 2 Area of MinCuQpDeltaArea related to the CTU width, height, area, log 2 Area, or MaxDepth. For calculation, cbWidth*cbHeight/4 may be replaced by currentAreaDepth+2. In one embodiment, the log 2 value of the signaled MinCuQpDeltaArea is constrained to be an even number. In another embodiment, a value related to MinCuQpDeltaArea is signaled, for example, MinCuQpDeltaArea is derived by multiplying a signaled value (signaled_value) by 2, such as 2*signaled_value is used to derive MinCuQpDeltaArea, or log 2 MinCuQpDeltaArea. For example, MinCuQpDeltaArea=1<<(signaled_value*2) or MinCuQpDeltaArea=CTU_Area>>(signaled_value*2).

Syntax elements associated with a delta QP, such as the absolute variable cu_qp_delta_abs and the sign flag cu_qp_delta_sign_flag, are signaled at the TU level when the enabled_flag indicates delta QP is enabled and the variable IsCuQpDeltaCoded indicates delta QP is not yet coded. The value of the delta QP CuQpDeltaVal is derived based on these two syntax elements, cu_qp_delta_abs and cu_qp_delta_sign_flag. A final QP is reconstructed according to a reference QP and the delta QP CuQpDeltaVal.

A maximum delta QP signaling depth diff_cu_qp_delta_depth may be signaled separately for luma and chroma components when separate CU splitting structures are employed for the luma and chroma components. In another embodiment, a maximum delta QP signaling depth diff_cu_qp_delta_depth can be the same for luma and chroma components. In yet another embodiment, a maximum delta QP signaling depth for the chroma components is set as a value that depends on a maximum delta QP signaling depth for the luma component when separate CU splitting structures are applied for the luma and chroma components.

A multiple-tree depth (MTDepth) is defined to represent an area of a split node more precisely by employing an idea of using different depth values for different split nodes belonged to the same parent node and/or using different depth values for different splitting methods including QT, BT, and TT splitting. In one specific embodiment of MTDepth counting, a depth of first and third split nodes is a depth of a parent split node plus 2 while a depth of a second split node is the depth of the parent split node plus 1 when TT splitting is applied; and depths of two split nodes are a depth of a parent split node plus 1 when BT splitting is applied. In another embodiment, when counting the depth caused by TT splitting, each depth of three split nodes is a depth of a parent split node plus 1; and when counting depths caused by BT splitting, depths of two split nodes are a depth of a parent split node plus 1. In yet another embodiment, when counting depths caused by TT splitting, depths of all three split nodes are a depth of a parent split node plus 2; and when counting deps caused by BT splitting, depths of two split nodes are a depth of a parent split node plus 1. In one embodiment, a depth of a current block is increased by 2 when the current block is partitioned from QT splitting.

Delta QP Signaling depends on QT Depth or Area Since the second level of MTT is started from leaf nodes of QT splitting, an embodiment sets one constraint to signal delta QPs at QT nodes. One delta QP is coded and shared for all leaf CUs in a QT node. A minimum size of units in delta QP signaling can be signaled as the same as that in HEVC. In another embodiment, since the second level of MTT is started from leaf nodes of QT splitting, HEVC delta QP signaling for the QT partitions is reused. For example, for a QT leaf node, if a QT leaf node size, area, width, or height is larger than or equal to a threshold, or if a QT depth of the QT leaf node is smaller than or equal to a threshold, at most one delta QP can be signaled. Leaf CUs within this QT leaf node share the signaled delta QP. If a QT node is not a leaf CU and a size, area, width, or height is equal to a threshold, at most one delta QP can be signaled. The leaf CUs within this QT node share the signaled delta QP. Delta QP signaling for QT partitions is similar to or the same as the HEVC delta QP signaling. The leaf CUs partitioned from BT or TT splitting within the QT node share the same delta QP. The threshold can be predefined, derived, or signaled in one or a combination of a slice, picture, tile, and sequence level.

Figure 6:
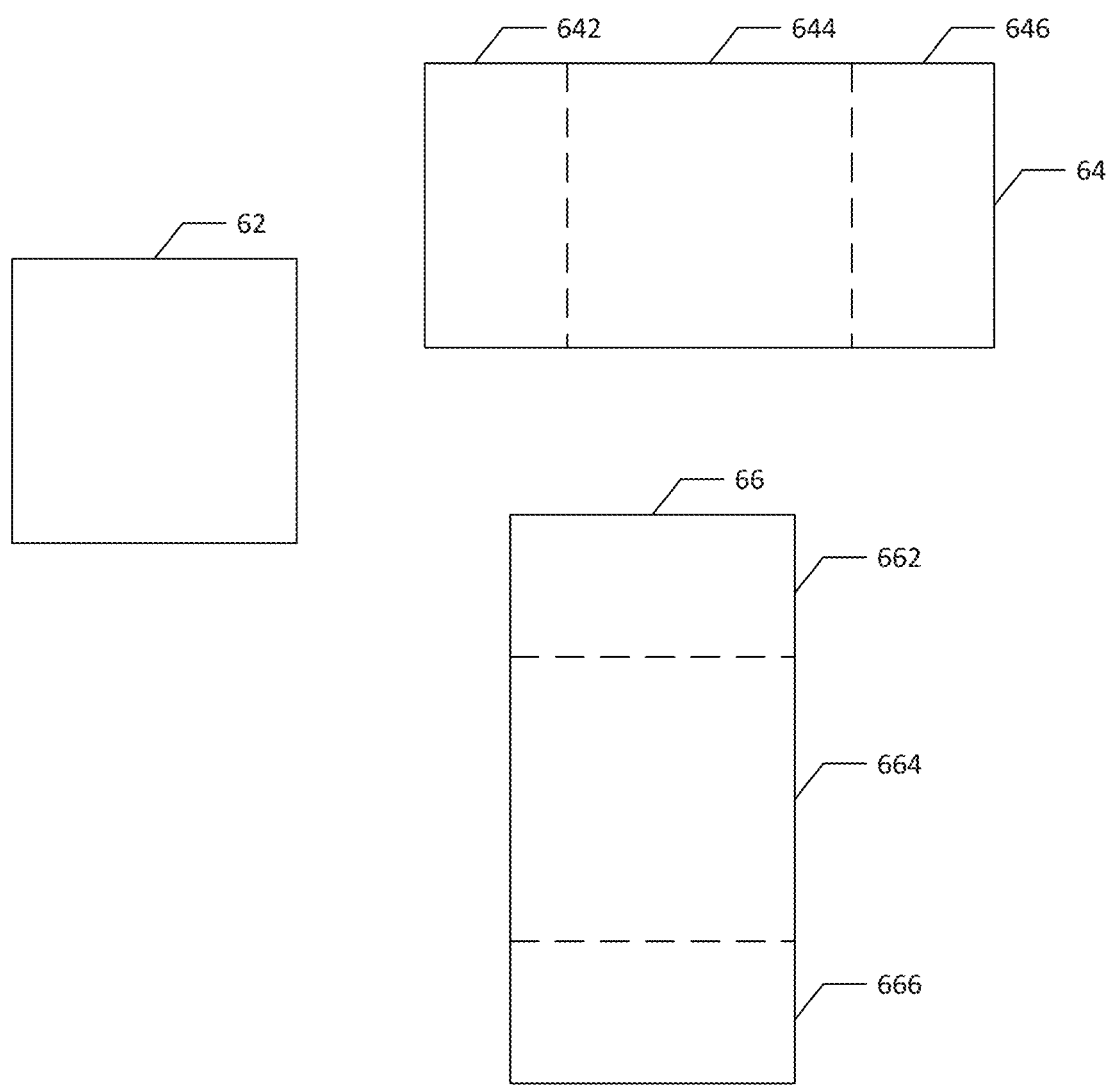
FIG. 6 illustrates two examples of partitioning a block with an area equal to two times the threshold for QP signaling by TT splitting.

Delta QP Signaling for a Special Case A special case occurs when delta QP signaling is conditioned by the area of a block and ternary tree splitting is applied to split a parent node into three split nodes, where the area of the first or third split node is smaller than a threshold of delta QP signaling (e.g. the minimum delta QP signaling CU area), and the area of the second split node is equal to the threshold of delta QP signaling. For example, the area of a parent node is two times of the threshold of delta QP signaling, after partitioning the parent node by TT splitting, an area of each of a first split node and a third split node is half of the threshold while an area of a second split node is equal to the threshold. FIG. 6 illustrates two examples of the special case which partitions a parent block by TT splitting. A block 62 demonstrates a size of a minimum delta QP signaling CU area, which is the threshold for delta QP signaling, so any split node with an area larger than or equal to the block 62 may have its own delta QP signaled in an associated TU. Each of a parent block 64 and parent block 66 has an area equal to two times the minimum delta QP signaling CU area. The parent block 64 is partitioned by vertical TT splitting and parent block 66 is partitioned by horizontal TT splitting. The area of a first split node 642 or a third split node 646 is smaller than the minimum delta QP signaling CU area while the area of a second split node 644 is equal to the minimum delta QP signaling CU area. Similarly, the area of a first split node 662 or a third split node 666 is smaller than the minimum delta QP signaling CU area while the area of a second split node 664 is equal to the minimum delta QP signaling CU area. For example, the minimum delta QP signaling CU area is 32×32, the parent block 64 has a size of 64×32, and the parent block 66 has a size of 32×64.

Some embodiments of the present invention set the rule of delta QP signaling for the above mentioned special case. In one embodiment, only one delta QP can be signaled for all three split nodes when the area of the first or third split node is smaller than a minimum delta QP signaling CU area and the area of the second split node is equal to the minimum delta QP signaling CU area. To generalize the rule for the special case, a delta QP is signaled for all split nodes of a parent node to share if at least one of the split nodes has an area smaller than the minimum delta QP signaling CU area and there is at least one non-zero coefficient or escape palette.

One or more syntax elements of signaling a delta QP at the TU level may be similar to that of in HEVC, for example, an absolute variable cu_qp_delta_abs and a sign flag cu_qp_delta_sign_flag are signaled if an enable flag cu_qp_delta_enabled_flag indicates delta QP is enabled and the variable IsCuQpDeltaCoded is set to 0. The value of the delta QP CuQpDeltaVal is derived based on these two syntax elements cu_qp_delta_abs and cu_qp_delta_sign_flag, and a final QP is reconstructed according to a reference QP and the delta QP CuQpDeltaVal. The sign flag cu_qp_delta_sign_flag is inferred to be equal to 0 if this sign flag is not present. Other methods of signaling a delta QP at the TU level can also be applied.

In another embodiment of delta QP signaling for the special case, only one delta QP is signaled for the second split node and there is no new delta QP coded for the first and third split nodes. The QP used in the first split node is a last QP, the QP used in the second split node is derived from a signaled delta QP, and this QP is also used in the third split node. One or more syntax elements for signaling a delta QP at the TU level can be similar to delta QP signaling in HEVC, for example, the delta QP is derived based on an absolute variable and a sign flag. A final QP is reconstructed by a reference QP and the delta QP.

In yet another embodiment of delta QP signaling for the special case, each of the three TT split nodes has its own delta QP, so at most three delta QPs are signaled for these three TT split nodes. In this embodiment, for a current node with an area equal to two times the minimum delta QP signaling CU area and is partitioned by QT splitting, each quadtree split node may have its own delta QP or first two quadtree split nodes are grouped as a first Quantization Group (QG) while last two quadtree split nodes are grouped as a second QG. The variable IsCUQpDeltaCoded is set to 0 for the first QG and for the second QG. For a current node with a size larger than or equal to the minimum delta QP signaling CU area, or for a current node with a size smaller than the minimum delta QP signaling CU area but its parent size is larger than the minimum delta QP signaling CU area, one delta QP can be signaled for the current node. The variable IsCuQpDeltaCoded is set to 0 for the current node.

The size or area of a split node or a parent node may be derived from a depth, and the minimum delta QP signaling CU area may also be derived from a maximum delta QP signaling depth. In some embodiments of the present invention, a multiple-tree depth (MTDepth) is defined to count the depth, and the concept of the MTDepth is using different depth values for different split nodes belonged to the same parent node and/or using different depth values for different splitting methods including QT, BT, and TT splitting. For example, a depth of a first or third split node partitioned from a parent node by TT splitting is equal to a depth of the parent node plus 2, and a depth of a second split node partitioned from the parent node is equal to the depth of the parent node plus 1. A depth of a split node partitioned from a parent node by BT splitting is equal to a depth of the parent node plus 1. A depth of a quadtree split node is equal to a MTDepth of its parent node plus 2.

A flag indicating whether a current split node is a first or third split node in ternary tree splitting is used for delta QP signaling according to some embodiments. For example, in the case of three ternary tree split nodes can have their own delta QPs, if an area of a current split node is larger than or equal to a minimum delta QP signaling CU area, or if the area is equal to half of the minimum delta QP signaling CU area but the current split node is a first or third split node in ternary tree splitting, one delta QP may be signaled for the current split node. The variable IsCuQpDeltaCoded is set to 0 for the current node to indicate a delta QP may be signaled. In some other embodiments, a flag indicating whether a current split node is a second split node in ternary tree splitting is used for delta QP signaling. For example, in the case of only one delta QP may be signaled for all three ternary tree splitting nodes, if an area of a current split node is larger than a minimum delta QP signaling CU area, or if the area is equal to the minimum delta QP signaling CU area and the current split node is not a second split node in ternary tree splitting, one delta QP may be signaled for the current split node by setting the variable IsCuQpDeltaCoded to 0 for the current split node.

In some other embodiments, a current split node decides whether a delta QP may be signaled by referring to a parent CU size (parentCuArea) of the current split node. That is a children block decides whether a delta QP is signaled not only according to an area of the children block but also according to information of its parent block. For example, in the case of three ternary tree split nodes can have their own delta QPs, if an area of a current split node is equal to two times the minimum delta QP signaling CU area, each split node partitioned from the current split node can have its own delta QP. If an area of a parent node of a current split node is larger than the minimum delta QP signaling CU area, the variable IsCuQpDeltaCoded is set to 0 for the current split node, which indicates one delta QP can be signaled for the current split node. The syntax tables shown in Table 3 illustrates an example of determining QP signaling based on the parent CU size when the three TT split nodes have their own delta QPs.

TABLE 3

| coding quadtree( x0, y0, log2CbSize, cqtDepth, treeType, parentCuArea )<br>{ | Des criptor |
|---|---|
| if( ( ( ( x0 +( 1 <<log2CbSize ) <= pic_width_in_luma_samples<br>) 1 : 0 ) +<br>( ( y0 +( 1 <<log2CbSize ) <= pic_height_in_luma_samples<br>) 1 : 0 ) +<br>( ( ( 1 <<log2CbSize ) <= MaxBtSizeY ) 1 : 0) ) >= 2 &&<br>log2CbSize >MinQtLog2SizeY )<br>qt_split_cu_flag+ x0 ++ y0 +<br>if ( ( ( (1 <<(2*log2Cb Size)) >=MinCuQpDeltaArea ) ‖<br>( (1 <<(2*log2CbSize)) <MinCuQpDeltaArea<br>&& parentCuArea >MinCuQpDeltaArea) ) {<br>IsCuQpDeltaCoded =0<br>CuQpDeltaVal = 0<br>}<br>if( qt_split_cu_flag+ x0 ++ y0 + ) {<br>x1 = x0 +( 1 <<( log2CbSize 1 ) )<br>y1 = y0 +( 1 <<( log2Cb Size 1 ) )<br>coding_quadtree( x0, y0, log2CbSize 1, cqtDepth + 1, treeType,<br>1 <<(log2CbSize*2) )<br>if( x1 <pic width in luma samples )<br>coding_quadtree( x1, y0, log2CbSize 1, cqtDepth + 1, treeType,<br>1 <<(log2CbSize*2) )<br>if( y1 <pic_height_in_luma_samples )<br>coding_quadtree( x0, y1, log2CbSize 1, cqtDepth + 1, treeType,<br>1 <<(log2CbSize*2) )<br>if( x1 <pic_width_in_luma_samples && y1 <<br>pic_height_in_luma_samples )<br>coding_quadtree( x1, y1, log2CbSize 1, cqtDepth + 1, treeType,<br>1 <<(log2CbSize*2) )<br>}1 else<br>multi_type_tree( x0, y0, 1 <<log2Cb Size, 1 <<log2Cb Size, 0, 0, 0, treeTy<br>pe, parentCuArea )<br>} | ae(v) |

| multi_type_tree( x0, y0, cbWidth, cbHeight, mttDepth, depthOffset, partIdx, tre eType, parentCuArea ) { | Des criptor |
|---|---|
| if( ( allowSplitBtVer ‖ allowSplitBtHor ‖ allowSplitTtVer ‖<br>allowSplitTtHor ) &&<br>( x0 + cbWidth <= pic_width_in_luma_samples ) &&<br>(y0 + cbHeight <= pic_height_in_luma_samples ) )<br>mtt_split_cu_flag<br>if ( (cbWidth*cbHeight >= MinCuQpDeltaArea) ‖<br>(cbWidth*cbHeight < MinCuQpDeltaArea && parentCuArea ><br>MinCuQpDeltaArea) ) {<br>IsCuQpDeltaCoded = 0<br>CuQpDeltaVal = 0<br>}<br>if( mtt_split_cu_flag ) {<br>if( ( allowSplitBtHor ‖ allowSplitTtHor ) &&<br>( allowSplitBtVer ‖ allowSplitTtVer ) )<br>mtt_split_cu_vertical_flag<br>if( ( allowSplitBtVer && allowSplitTtVer && mtt_split_cu_vertical_flag)<br>‖<br>( allowSplitBtHor && allowSplitTtHor && !mtt_split_cu_vertical_flag ) )<br>mtt_split_cu_binary_flag | ae(v)<br><br><br><br><br><br><br><br><br><br><br><br><br>ae(v)<br><br><br><br>ae(v) |

TABLE 3-continued

```
if( MttSplitMode[ x0 ][ y0 ][ mttDepth] ==SPLIT_BT_VER) {
depthOffset +=( x0 +cbWidth > pic_width_in_luma_samples ) 1 : 0
x1 = x0 +( cbWidth / 2 )
multi type tree( x0, y0, cbWidth / 2, cbHeight, mttDepth + 1, depthOffset, 0, tree
Type, cbWidth* cbHeight)
if( x1 < pic_width_in_luma_samples )
multi_type_tree( x1, y0, cbWidth / 2, cbHeightY, mttDepth + 1, depthOffset, 1, tre
eType, cbWidth* cbHeight)
} else if( MttSplitMode+ x0 ++ y0 ++ mttDepth+ = =SPLIT_BT_HOR ) {
depthOffset += (y0 +cbHeight > pic_height_in_luma_samples ) 1 : 0
y1 = y0 + ( cbHeight / 4 )
multi type tree( x0, y0, cbWidth, cbHeight / 2, mttDepth + 1, depthOffset, 0, tree
Type, cbWidth* cbHeight)
if( y1 < pic_height_in_luma_samples )
multi_type_tree( x0, y1, cbWidth, cbHeight / 2, mttDepth + 1, depthOffset, 1, tree
Type, cbWidth* cbHeight)
} else if( MttSplitMode[ x0 ][ y0 ][ mttDepth] = = SPLIT_TT_VER) {
x1 = x0 + ( cbWidth / 4 )
x2 = x0 + ( 3 * cbWidth / 4 )
multi_type_tree( x0, y0, cbWidth / 4, cbHeight, mttDepth + 1, depthOffset, 0, tree
Type, cbWidth* cbHeight)
multi type tree( x1, y0, cbWidth / 2, cbHeight, mttDepth + 1, depthOffset, 1, tree
Type, cbWidth* cbHeight)
multi type tree( x2, y0, cbWidth / 4, cbHeight, mttDepth + 1, depthOffset, 2, tree
Type, cbWidth* cbHeight)
} else {/* SPLIT_TT_HOR */
y1 = y0 + ( cbHeight / 4 )
y2 = y0 + ( 3 * cbHeight / 4)
multi_type_tree( x0, y0, cbWidth, cbHeight / 4, mttDepth + 1, depthOffset, 0, tree
Type, cbWidth* cbHeight)
multi_type_tree( x0, y1, cbWidth, cbHeight / 2, mttDepth + 1, depthOffset, 1, tree
Type, cbWidth* cbHeight)
multi type tree( x0, y2, cbWidth, cbHeight / 4, mttDepth + 1, depthOffset, 2 , tree
Type, cbWidth* cbHeight)
}
} else
coding unit( x0, y0, cbWidth, cbHeight, treeType )
}
```

In the previous embodiments, the delta QP signaling decision is made at the children node. Some embodiments of the present invention determine whether a delta QP can be signaled for a split node in a parent node of the split node. In each parent node, whether a delta QP can be independently signaled in each split node partitioned from the parent node is determined. One or more delta QP related information, such as delta QP signaling availability or availability of reset IsCuQpDeltaCoded, can be passed from a parent node to the split nodes if necessary. The delta QP signaling decision is then derived in the split node based on information of a minimum delta QP signaling CU area MinCuQpDeltaArea, width, height, size, area, or depth of a current node, partition type, picture size, current node position, delta QP related information passed from the parent node, or a combination of above. For example, a reset variable resetQpDeltaCoded is passed from a parent node to a current split node, and if the reset variable is true and the function of delta QP signaling is enabled, the variable IsCuQpDeltaCoded is set to 0. If the current split node is split into children nodes, a variable resetQpDeltaCodedForChildren is determined and passed to the children nodes. For a CTU, the variable IsCuQpDeltaCoded can be set to 0 and the reset variable resetQpDeltaCoded for a CTU is set to 1.

In an embodiment, a parent node with a size larger than the minimum delta QP signaling CU area determines a reset flag for a split node partitioned from the parent node by referring to an area, size, or depth of the split node or a splitting type for partitioning the parent node. The reset flag is passed to the split node to control whether a delta QP can be signaled for this split node. For example, a delta QP is signaled for all TT split nodes of a parent node when a first split node partitioned from the parent node is smaller than a threshold for delta QP signaling, all TT split nodes share this delta QP as no more delta QP is signaled for the second and third split nodes even though an area of the second split node is equal to the threshold for delta QP signaling.

In an embodiment, when an area of one of split nodes partitioned from a parent node is smaller than MinCuQpDeltaArea and an area of the parent node is larger than MinCuQpDeltaArea, all the split nodes share at most one delta QP. In one example, if an area of one split node partitioned from a current node is smaller than MinCuQpDeltaArea and an area of the current node is larger than MinCuQpDeltaArea, none of the split nodes partitioned from the current node can set the variable IsCuQpDeltaCoded to 0. This example is illustrated in the syntax tables shown in Table 4.

TABLE 4

| dual_tree_implicit_qt_split( x0, y0, log2Cb Size, cqtDepth, qtResetQpDeltaCoded) { | Descriptor |
|---|---|
| if (cu_qp_delta_enabled_flag && qtResetQpDeltaCoded) { IsCuQpDeltaCoded = 0 CuQpDeltaVal = 0 | |

TABLE 4-continued

```
}
if( log2Cb Size > 6) {
x1 = x0 +( 1 << ( log2Cb Size ? 1 ) )
y1 = y0 +( 1 << ( log2Cb Size ? 1 ) )
qtResetQpDeltaCoded = (cbWidth*cbHeight/4 >= MinCuQpDeltaArea
&&
qtResetQpDeltaCoded) ? 1: 0
dual_tree_implicit_qt_split( x0, y0, log2CbSize ? 1, cqtDepth + 1,
qtResetQpDeltaCoded)
if( x1 < pic_width_in_luma_samples )
dual_tree_implicit_qt_split( x1, y0, log2Cb Size ? 1, cqtDepth + 1,
qtResetQpDeltaCoded)
if( y1 < pic_height_in_luma_samples )
dual_tree_implicit_qt_split( x0, y1, log2CbSize ? 1, cqtDepth + 1,
qtResetQpDeltaCoded)
if( x1 < pic_width_in_luma_samples && y1 <
pic_height_in_luma_samples )
dual_tree_implicit_qt_split( x1, y1, log2CbSize ? 1, cqtDepth + 1,
qtResetQpDeltaCoded)
} else {
coding_quadtree( x0, y0, log2Cb Size, cqtDepth,
DUAL_TREE_LUMA,
qtResetQpDeltaCoded)
coding_quadtree( x0, y0, log2Cb Size, cqtDepth,
DUAL_TREE_CHROMA,
qtResetQpDeltaCoded)
}
}
```

| | |
|---|---|
| coding_quadtree( x0, y0, log2Cb Size, cqtDepth, treeType, qtResetQpDeltaCoded) { | Descriptor |

```
if( ( ( ( x0 +( 1 << log2Cb Size) <= pic_width_in_luma_samples
) ? 1 : 0 ) +
( ( y0 +( 1 << log2CbSize ) <= pic_height_in_luma_samples
) ? 1 : 0 ) +
( ( ( 1 << log2Cb Size) <=MaxBtSizeY ) ? 1 : 0) ) >= 2 &&
log2Cb Size > MinQtLog2SizeY )
qt_split_cu_flag[ x0 ][ y0]                                          ae(v)
if (Cu_qp_delta_enabled_flag && qtResetQpDeltaCoded) {
IsCuQpDeltaCoded =0
CuQpDeltaVal =0
}
if( qt_split_cu_flag[ x0 ][ y0 ] ) {
x1 = x0 +( 1 << ( log2CbSize - 1 ) )
y1 = y0 +( 1 << ( log2Cb Size - 1 ) )
qtResetQpDeltaCoded = (cbWidth*cbHeight/4 >= MinCuQpDeltaArea
&&
qtResetQpDeltaCoded) ? 1: 0
coding quadtree( x0, y0, log2Cb Size ? 1, cqtDepth + 1, treeType,
qtResetQpDeltaCoded)
if( x1 < pic_width_in_luma_samples )
coding_quadtree( x1, y0, log2Cb Size ? 1, cqtDepth + 1, treeType,
qtResetQpDeltaCoded)
if( y1 < pic_height_in_luma_samples )
coding_quadtree( x0, y1, log2Cb Size ? 1, cqtDepth + 1, treeType,
qtResetQpDeltaCoded )
if( x1 < pic_width_in_luma_samples && y1 <
pic_height_in_luma_samples )
coding_quadtree( x1, y1, log2Cb Size ? 1, cqtDepth + 1, treeType,
qtResetQpDeltaCoded )
} else {
mttResetQpDeltaCoded = ((cbWidth*cbHeight >= MinCuQpDeltaArea)
&&
qtResetQpDeltaCoded) ? 1 : 0
multi_type_tree( x0, y0, 1 << log2Cb Size, 1 << log2Cb Size, 0, 0, 0, treeTy
pe,
mttResetQpDeltaCoded)
}
}
```

| | |
|---|---|
| multi_type_tree( x0, y0, cbWidth, cbHeight, mttDepth, depthOffset, partIdx, tre eType, mttResetQpDeltaCoded ) { | Descriptor |

```
if( ( allowSplitBtVer || allowSplitBtHor || allowSplitTtVer ||
allowSplitTtHor ) &&
( x0 + cbWidth <= pic_width_in_luma_samples ) &&
(y0 + cbHeight <= pic_height_in_luma_samples ) )
mtt_split_cu_flag                                                    ae(v)
if (cu_qp_delta_enabled_flag && mttResetQpDeltaCoded) {
```

TABLE 4-continued

```
IsCuQpDeltaCoded = 0
CuQpDeltaVal = 0
}
if( mtt_split_cu_flag ) {
if( ( allowSplitBtHor || allowSplitTtHor ) &&
( allowSplitBtVer || allowSplitTtVer ) )
mtt_split_cu_vertical_flag                                                    ae(v)
if( ( allowSplitBtVer && allowSplitTtVer && mtt_split_cu_vertical_flag)
||
( allowSplitBtHor && allowSplitTtHor && !mtt_split_cu_vertical_flag ) )
mtt_split_cu_binary_flag                                                      ae(v)
if( MttSplitMode[ x0 ][ y0 ][ mttDepth] = = SPLIT_BT_VER) {
depthOffset + = ( x0 + cbWidth > pic_width_in_luma_samples ) ? 1 : 0
x1 = x0 + ( cbWidth / 2 )
mttResetQpDeltaCoded = ((cbWidth*cbHeight/2 >= MinCuQpDeltaArea)
&&
mttResetQpDeltaCoded ) ? 1: 0
multi_type_tree( x0, y0, cbWidth / 2, cbHeight, mttDepth + 1, depthOffset, 0, tree
Type,
mttResetQpDeltaCoded )
if( x1 < pic_width_in_luma_samples )
multi_type_tree( x1, y0, cbWidth / 2, cbHeightY, mttDepth + 1, depthOffset, 1, tre
eType,
mttResetQpDeltaCoded)
} else if( MttSplitMode[ x0 ][ y0 ][ mttDepth] == SPLIT_BT_HOR ) {
depthOffset += (y0 + cbHeight > pic_height_in_luma_samples ) ? 1 : 0
y1 =y0 +( cbHeight / 2 )
mttResetQpDeltaCoded =((cbWidth*cbHeight/2 >=MinCuQpDeltaArea)
&&
mttResetQpDeltaCoded ) ? 1: 0
multi_type _ree( x0, y0, cbWidth, cbHeight / 2, mttDepth + 1, depthOffset, 0, tree
Type,
mttResetQpDeltaCoded)
if( y1 < pic_height_in_luma_samples )
multi_type_tree( x0, y1, cbWidth, cbHeight / 2, mttDepth + 1, depthOffset, 1, tree
Type,
mttResetQpDeltaCoded)
} else if( MttSplitMode[ x0 ][ y0 ][ mttDepth] == SPLIT_TT_VER) {
x1 = x0 +( cbWidth / 4 )
x2 = x0 +( 3 * cbWidth / 4 )
mttResetQpDeltaCoded = ((cbWidth*cbHeight/4 >= MinCuQpDeltaArea)
&&
mttResetQpDeltaCoded ) ? 1: 0
multi_type_tree( x0, y0, cbWidth / 4, cbHeight, mttDepth + 1, depthOffset, 0, tree
Type,
mttResetQpDeltaCoded)
multi_type_tree( x1, y0, cbWidth / 2, cbHeight, mttDepth + 1, depthOffset, 1, tree
Type,
mttResetQpDeltaCoded)
multi_type_tree( x2, y0, cbWidth / 4, cbHeight, mttDepth + 1, depthOffset, 2, tree
Type,
mttResetQpDeltaCoded)
} else {/* SPLIT_TT_HOR */
y 1 =y0 + ( cbHeight / 4 )
y2 =y0 + ( 3 * cbHeight / 4)
mttResetQpDeltaCoded = ((cbWidth*cbHeight/4 >= MinCuQpDeltaArea)
&&
mttResetQpDeltaCoded ) ? 1: 0
multi_type_tree( x0, y0, cbWidth, cbHeight / 4, mttDepth + 1, depthOffset, 0, tree
Type,
mttResetQpDeltaCoded)
multi_type_tree( x0, y1, cbWidth, cbHeight / 2, mttDepth + 1, depthOffset, 1, tree
Type,
mttResetQpDeltaCoded )
multi_type_tree( x0, y2, cbWidth, cbHeight / 4, mttDepth + 1, depthOffset, 2 ,
tree
Type,
mttResetQpDeltaCoded)
}
} else
coding unit( x0, y0, cbWidth, cbHeight, treeType )
}
```

A multiple-tree depth (MTDepth) is defined to count a depth of a split node and to represent an area of the split node. In one embodiment, when counting the depth by TT splitting, depths of first and third split nodes are a depth of a parent split node plus 2, and a depth of a second split node is the depth of the parent split node plus 1. When counting the depth by BT splitting, depths of two split nodes are a depth of a parent split node plus 1. This example is illustrated in the syntax tables shown in Table 5. In another embodiment, when counting the depth by TT splitting, depths of all three split nodes are a depth of a parent split node plus 1, and when counting the depth by BT splitting, depths of two split nodes are the depth of the parent split node plus 1. In yet another embodiment, when counting the depth by TT splitting, depths of all three split nodes are a depth of a parent split node plus 2, and when counting the depth by BT splitting, depths of two split nodes are the depth of the parent split node plus 1. In one embodiment, a depth is increased by 2 when a split node is partitioned using quadtree splitting.

TABLE 5

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   if( slice_alf_enabled_flag ){ | |
|     alf_ctb_flag[ 0 ][ xCtb >> Log2CtbSize ][ yCtb >> Log2CtbSize ] | ae(v) |
|     if( alf_chroma_idc = = 1 \|\| alf_chroma_idc = = 3 ) | |
|       alf_ctb_flag[ 1 ][ xCtb >> Log2CtbSize ][ yCtb >> Log2CtbSize ] | ae(v) |
|     if( alf_chroma_idc = = 2 \|\| alf_chroma_idc = = 3 ) | |
|       alf_ctb_flag[ 2 ][ xCtb >> Log2CtbSize ][ yCtb >> Log2CtbSize ] | ae(v) |
|   } | |
|   if( slice_type == I && qtbtt_dual_tree_intra_flag ) | |
|     dual_tree_implicit_qt_split ( xCtb, yCtb, CtbLog2SizeY, 0, 1 ) | |
|   else | |
|     coding_quadtree( xCtb, yCtb, CtbLog2SizeY, 0, SINGLE_TREE, 1 ) | |
| } | |
| dual_tree_implicit_qt_split( x0, y0, log2Cb Size, cqtDepth, resetQpDeltaCoded ) { | |
|   if ( cu_qp_delta_enabled_flag && resetQpDeltaCoded ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( log2CbSize > 6 ) { | |
|     x1 = x0 + ( 1 << ( log2Cb Size − 1 ) ) | |
|     y1 = y0 + ( 1 << ( log2Cb Size − 1 ) ) | |
|     resetQpDeltaCodedForChildren = ( 2*(cqtDepth+1) <= diff_cu_qp_delta_depth ) ? 1: 0 | |
|     dual_tree_implicit_qt_split( x0, y0, log2CbSize − 1, cqtDepth + 1, resetQpDeltaCodedForChildren ) | |
|     if( x1 < pic_width_in_luma_samples ) | |
|       dual_tree_implicit_qt_split( x1, y0, log2Cb Size − 1, cqtDepth + 1, resetQpDeltaCodedForChildren ) | |
|     if( y1 < pic_height_in_luma_samples ) | |
|       dual_tree_implicit_qt_split( x0, y1, log2CbSize − 1, cqtDepth + 1, resetQpDeltaCodedForChildren ) | |
|     if( x1 < pic_width_in_luma_samples && y1 < pic_height_in_luma_samples ) | |
|       dual_tree_implicit_qt_split( x1, y1, log2Cb Size − 1, cqtDepth + 1, resetQpDeltaCodedForChildren) | |
|   } else { | |
|     coding_quadtree( x0, y0, log2Cb Size, cqtDepth, DUAL_TREE_LUMA, resetQpDeltaCoded ) | |
|     coding_quadtree( x0, y0, log2Cb Size, cqtDepth, DUAL_TREE_CHROMA, resetQpDeltaCoded ) | |
|   } | |
| } | |
| coding_quadtree( x0, y0, log2CbSize, cqtDepth, treeType, resetQpDeltaCoded ) { | |
|   minQtSize = ( treeType = = DUAL_TREE_CHROMA ) ? MinQtSizeC : MinQtSizeY | |
|   maxBtSize = ( treeType = = DUAL_TREE_CHROMA ) ? MaxBtSizeC : MaxBtSizeY | |
|   if( ( ( ( x0 + ( 1 << log2CbSize ) <= pic_width_in_luma_samples ) ? 1 : 0 ) + ( ( y0 + ( 1 << log2CbSize ) <= pic_height_in_luma_samples ) ? 1 : 0 ) + ( ( ( 1 << log2CbSize ) <= maxBtSize ) ? 1 : 0 ) ) >= 2 && ( 1 << log2CbSize ) > minQtSize ) | |
|     qt_split_cu_flag[ x0 ][ y0 ] | ae(v) |
|   if( cu_qp_delta_enabled_flag && resetQpDeltaCoded ) { | |
|     IsCuQpDeltaCoded = 0 | |
|     CuQpDeltaVal = 0 | |

TABLE 5-continued

|  | Descriptor |
|---|---|

```
                    CuQgTopLeftX = x0
                    CuQgTopLeftY = y0
                }
            if( qt_split_cu_flag[ x0 ][ y0 ] ) {
                x1 = x0 + ( 1 << ( log2CbSize − 1 ) )
                y1 = y0 + ( 1 << ( log2Cb Size − 1 ) )
                resetQpDeltaCodedForChildren = ( 2*(cqtDepth+1) <=
diff_cu_qp_delta_depth ) ? 1: 0
                    coding_quadtree( x0, y0, log2CbSize − 1, cqtDepth + 1, treeType,
                            resetQpDeltaCodedForChildren )
                    if( x1 < pic_width_in_luma_samples )
                        coding_quadtree( x1, y0, log2CbSize − 1, cqtDepth + 1, treeType,
                                resetQpDeltaCodedForChildren )
                    if( y1 < pic_height_in_luma_samples )
                        coding_quadtree( x0, y1, log2CbSize − 1, cqtDepth + 1, treeType,
                                resetQpDeltaCodedForChildren )
                    if( x1 < pic_width_in_luma_samples && y1 < pic_height_in_luma_samples
)
                        coding_quadtree( x1, y1, log2Cb Size − 1, cqtDepth + 1, treeType,
                                resetQpDeltaCodedForChildren )
            } else
    multi_type_tree( x0, y0, 1 << log2Cb Size, 1 << log2Cb Size, cqtDepth, 0, 0, 0, tr
eeType,
                            cqtDepth<<1, resetQpDeltaCoded )
            }
    multi_type_tree( x0, y0, cbWidth, cbHeight, cqtDepth, mttDepth, depthOffset,
partIdx, treeType, cqgDepth, resetQpDeltaCoded ) {
            if( ( allowSplitBtVer || allowSplitBtHor || allowSplitTtVer ||
allowSplitTtHor ) &&
        ( x0 + cbWidth <= pic_width_in_luma_samples ) &&
        (y0 + cbHeight <= pic_height_in_luma_samples ) )
                        mtt_split_cu_flag                                                    ae(v)
                if( cu_qp_delta_enabled_flag && resetQpDeltaCoded ) {
                    IsCuQpDeltaCoded = 0
                    CuQpDeltaVal = 0
                    CuQgTopLeftX = x0
                    CuQgTopLeftY = y0
                }
                if( mtt_split_cu_flag ) {
                    if( ( allowSplitBtHor || allowSplitTtHor ) &&
                ( allowSplitBtVer || allowSplitTtVer ) )
                            mtt_split_cu_vertical_flag                                       ae(v)
                    if( ( allowSplitBtVer && allowSplitTtVer && mtt_split_cu_vertical_flag )
||
                ( allowSplitBtHor && allowSplitTtHor && !mtt_split_cu_vertical_flag ) )
                            mtt_split_cu_binary_flag                                         ae(v)
                    if( MttSplitMode[ x0 ][ y0 ][ mttDepth ] = = SPLIT_BT_VER ) {
                        depthOffset += ( x0 + cbWidth > pic_width_in_luma_samples ) ? 1 : 0
                        x1 = x0 + ( cbWidth / 2 )
                        resetQpDeltaCodedForChildren = (( cqgDepth + 1 ) <=
diff_cu_qp_delta depth ) ? 1: 0
                            multi_type_tree( x0, y0, cbWidth / 2, cbHeight,
                                    cqtDepth, mttDepth + 1, depthOffset, 0, treeType,
                                    cqgDepth + 1, resetQpDeltaCodedForChildren )
                            if( x1 < pic_width_in_luma_samples )
                                multi_type_tree( x1, y0, cbWidth / 2, cbHeightY,
                                        cqtDepth, mttDepth + 1, depthOffset, 1, treeType,
                                        cqgDepth + 1, resetQpDeltaCodedForChildren )
                    } else if( MttSplitMode[ x0 ][ y0 ][ mttDepth ] = = SPLIT_BT_HOR ) {
                        depthOffset += ( y0 + cbHeight > pic_height_in_luma_samples ) ? 1 : 0
                        y1 = y0 + ( cbHeight / 2 )
                        resetQpDeltaCodedForChildren = ( (cqgDepth + 1) <=
diff_cu_qp_delta_depth ) ? 1: 0
                            multi_type_tree( x0, y0, cbWidth, cbHeight / 2,
                                    cqtDepth, mttDepth + 1, depthOffset, 0, treeType,
                                    cqgDepth + 1, resetQpDeltaCodedForChildren )
                            if( y1 < pic_height_in_luma_samples )
                        multi_type_tree( x0, y1, cbWidth, cbHeight / 2,
                                cqtDepth, mttDepth + 1, depthOffset, 1, treeType,
                                cqgDepth + 1, resetQpDeltaCodedForChildren )
                    } else if( MttSplitMode[ x0 ][ y0 ][ mttDepth ] = = SPLIT_TT_VER ) {
                        x1 = x0 + ( cbWidth / 4 )
                        x2 = x0 + ( 3 * cbWidth / 4 )
                        resetQpDeltaCodedForChildren = ( (cqgDepth + 2) <=
diff_cu_qp_delta_depth ) ? 1: 0
                            multi_type_tree( x0, y0, cbWidth / 4, cbHeight,
                                    cqtDepth, mttDepth + 1, depthOffset, 0, treeType,
                                    cqgDepth + 2, resetQpDeltaCodedForChildren )
```

```
            multi_type_tree( x1, y0, cbWidth / 2, cbHeight,
                    cqtDepth, mttDepth + 1, depthOffset, 1, treeType,
                    cqgDepth + 1, resetQpDeltaCodedForChildren )
            multi_type_tree( x2, y0, cbWidth / 4, cbHeight,
                    cqtDepth, mttDepth + 1, depthOffset, 2, treeType,
                    cqgDepth + 2, resetQpDeltaCodedForChildren )
        } else { /* SPLIT_TT_HOR */
            y1 = y0 + ( cbHeight / 4 )
            y2 = y0 + ( 3 * cbHeight / 4 )
            resetQpDeltaCodedForChildren = ( (cqgDepth + 2) <=
diff_cu_qp_delta_depth ) ? 1: 0
            multi_type_tree( x0, y0, cbWidth, cbHeight / 4,
                    cqtDepth, mttDepth + 1, depthOffset, 0, treeType,
                    cqgDepth + 2, resetQpDeltaCodedForChildren )
            multi_type_tree( x0, y1, cbWidth, cbHeight / 2,
                    cqtDepth, mttDepth + 1, depthOffset, 1, treeType,
                    cqgDepth + 1, resetQpDeltaCodedForChildren )
            multi_type_tree( x0, y2, cbWidth, cbHeight / 4,
                    cqtDepth, mttDepth + 1, depthOffset, 2, treeType,
                    cqgDepth + 2, resetQpDeltaCodedForChildren)
        }
    } else
        coding_unit( x0, y0, cbWidth, cbHeight, treeType )
}
```

One variable called AreaDepth can be derived from a quadtree depth and MTTDepth or a MTDepth. For example, AreaDepth is derived as: AreaDepth=J*quadTreeDepth+ ((MTTDepth+K)>>N) or AreaDepth=(L*quadTreeDepth+ MTTDepth), where J, K, N, and L could be any integers. In the above syntax tables, cbWidth*cbHeight can be replaced by the variable AreaDepth of the current block. The minimum delta QP signaling CU area MinCuQpDeltaArea can be replaced by a depth value MinCuQpDeltaAreaDepth, where MinCuQpDeltaAreaDepth is signaled in a slice, picture, sequence, CTU-row, or tile level. The signaled syntax in the slice, picture, sequence, CTU-row, or tile-level can be an area, area-ratio, depth, or log 2Area of MinCuQpDeltaArea or a value of area, area-ratio, depth, or log 2Area of MinCuQpDeltaArea related to the CTU width, height, area, log 2Area, or MaxDepth. The product of the block width and height divided by 4 (cbWidth*cbHeight/4) can be replaced by AreaDepth plus 2. In one embodiment, the log 2 value of the signaled MinCuQpDeltaArea must be an even number. In another embodiment, a value related to MinCuQpDeltaArea is signaled, and the signaled_value is multiplied by 2 to derive MinCuQpDeltaArea or log 2 MinCuQpDeltaArea. For example, MinCuQpDeltaArea=1<<(signaled_value*2) or MinCuQpDeltaArea=CTU_Area>>(signaled_value*2).

One syntax element, cu_qp_delta_enabled_flag is signaled or derived to determine whether the function of delta QP signaling is enabled or not. This syntax element can be signaled in a sequence, picture, slice, tile, or CTU-row level. If this syntax element is equal to 0, a delta QP is not signaled as delta QP is not enabled. In one embodiment, cu_qp_delta_enabled_flag is used when deriving the variable IsCuQpDeltaCoded.

In one embodiment of partitioning a current split node into multiple children nodes, when an area of one children node is smaller than or equal to a minimum delta QP signaling CU area and an area of the current split node is larger than the minimum delta QP signaling CU area, or when all areas of the children nodes are larger than or equal to the minimum delta QP signaling CU area, each children node can signal its own delta QP. A variable resetQpDeltaCodedForChildren is set to 1 for all children nodes, and the variable IsCuQpDeltaCoded can be set to 0 for all children nodes in this case. When the area of a current spit node is equal to or smaller than the minimum delta QP signaling CU area, at most one delta QP can be signaled for all children nodes within the current split node. The variable resetQpDeltaCodedForChildren is set to 0 for all children nodes in this case. In another equivalent example, when a children node area is larger than or equal to the minimum delta QP signaling CU area, each of the children nodes can signal its own delta QP. The variable resetQpDeltaCodedForChildren is set to 1 for the children nodes. In this embodiment, for a leaf CU with a size equal to or larger than the minimum delta QP signaling CU area, at most one delta QP can be signaled, and for a leaf CU with a size smaller than the minimum delta QP signaling CU area but its parent node has a size larger than the minimum delta QP signaling CU area, at most one delta QP can be signaled. For a non-leaf CU current node, if an area of one children node is smaller than the minimum delta QP signaling CU area and an area of the current node is equal to the minimum delta QP signaling CU area, this current node shares the same delta QP information for all its children nodes. At most one delta QP can be signaled or parsed for this current node and a final QP derived from the delta QP is used by one or more children nodes. For a non-leaf CU current node with a size smaller than the minimum delta QP signaling CU area but its parent node has a size larger than the minimum delta QP signaling CU area, this current node shares the same delta QP information for all children nodes partitioned from the parent node. At most one delta QP can be signaled for this current node and a final QP derived from the delta QP is used by one or more nodes partitioned from the parent node. For a leaf CU, if the reset variable resetQpDeltaCoded is 1 or if the variable IsCuQpDeltaCoded is 0, at most one delta QP can be signaled. For example, for a current split node such as a CU or a TU, if the variable IsCuQpDeltaCoded is 0 and the luma or chroma cbf is 1, and a tree type is not DUAL_TREE_CHROMA when dual-tree coding is enabled, one delta QP is signaled. A top-left position of the current split node is stored when resetting the variable IsCuQpDeltaCoded, as the stored position can be used to derived a reference QP. The delta QP and the reference QP are used to reconstruct a final QP for the current split node.

In an exemplary embodiment, when an area of one of children nodes is smaller than MinCuQpDeltaArea, none of the children nodes can set the variable IsCuQpDeltaCoded to 0, and when areas of all children nodes are larger than or equal to MinCuQpDeltaArea, each children node can have its own delta QP. In one example, the variable resetQpDeltaCodedForChildren is set to 1 when areas of all children nodes are larger than or equal to MinCuQpDeltaArea, otherwise, when the area of one children node is smaller than MinCuQpDeltaArea, none of the children nodes can set the variable IsCuQpDeltaCoded to 0, and the variable resetQpDeltaCodedForChildren is set to 0. For a current split node, in order to determine the value of the variable resetQpDeltaCodedForChildren, the current node area divided by 4 is used when the current split node is partitioned by QT splitting or TT splitting, or the current node area divided by 2 is used when the current split node is partitioned by BT splitting.

If a CU size is larger than a minimum delta QP signaling CU area MinCuQpDeltaArea and the CU is divided into several TUs, and the TU size is equal to or larger than MinCuQpDeltaArea, one delta QP can be signaled for the CU with a size equal to or larger than MinCuQpDeltaArea. The sizes of the CU and TUs, as well as the minimum delta QP signaling CU area may be derived or represented by depths such as MTDepths and the maximum delta QP signaling depth.

Figure 7:
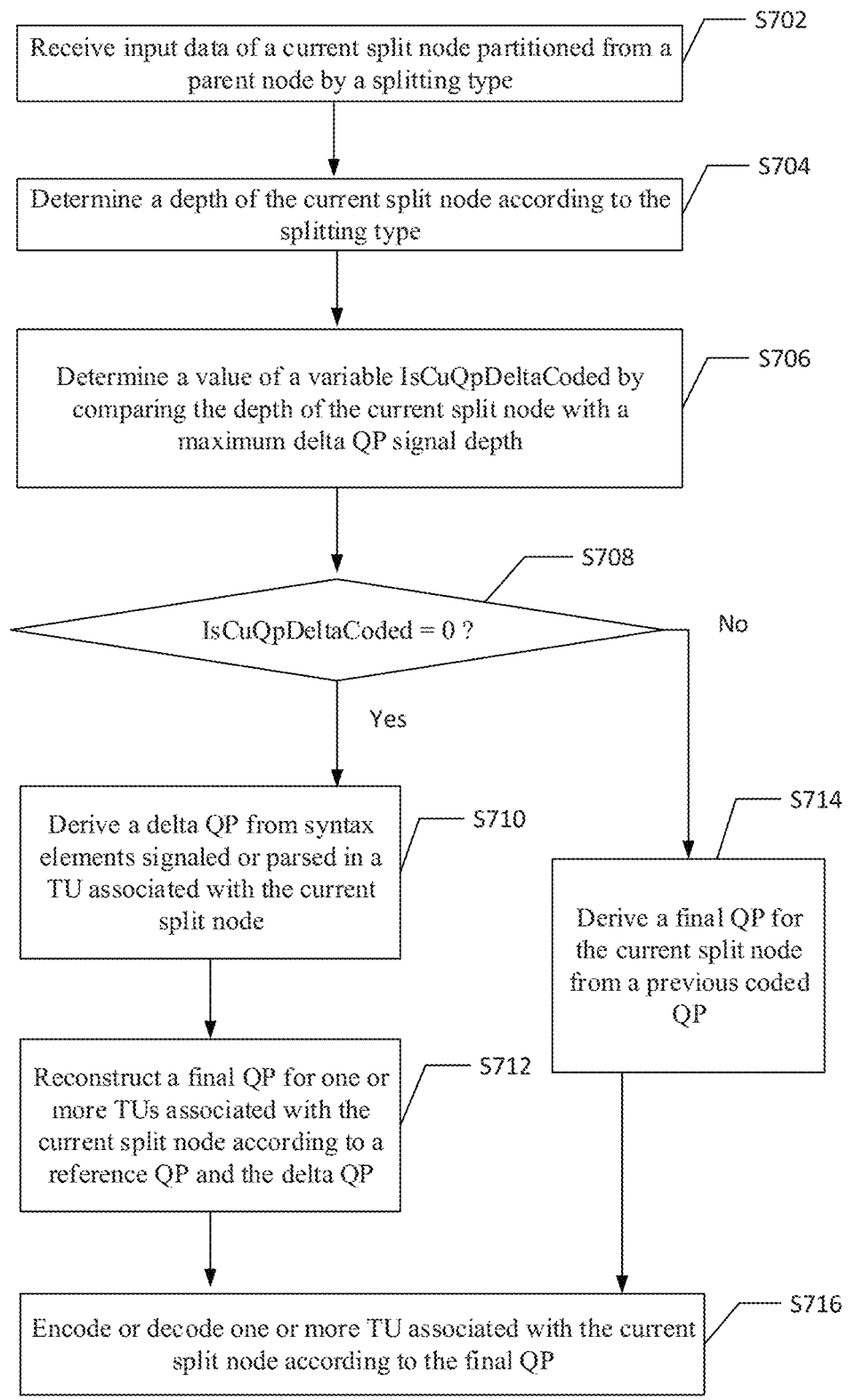
FIG. 7 is a flowchart of processing video data by signaling a delta QP for a split node depending on an area of the split node according to embodiments of the present invention.

Representative Flowchart for Delta QP Signaling Depends on Area FIG. 7 is a flowchart illustrating an embodiment of a video decoding system processing video data partitioning into leaf CUs according to a CU partitioning structure, where a delta QP is signaled depending on a depth representing the two-dimensional block area. The video decoding system receives input data associated with a current split node in step S702. The current split node is either a leaf CU or a non-leaf CU partitioned from a parent node by a splitting type, and it is a square block or a rectangular block. A depth of the current split node is determined according to the splitting type in step S704, for example, the depth is determined from an area of the current split node. A value of a variable IsCuQpDeltaCoded is determined by comparing the depth of the current split node with a maximum delta QP signal depth in step S706. The maximum delta QP signal depth may be predefined, derived, or signaled in a slice, picture, tile, or sequence level. The value of the variable IsCuQpDeltaCoded is checked in step S708, and if it is equal to 1, a final QP for the current split node is derived from a previous coded QP in step S714. If IsCuQpDeltaCoded=0, a delta QP is derived from one or more syntax elements signaled or parsed in a TU associated with the current split node in step S710, and a final QP is reconstructed for one or more TU associated with the current split node according to a reference QP and the delta QP in step S712. The video decoding system decodes one or more TUs associated with the current split node according to the final QP in step S716. In some embodiments, since a QP is only needed when there is a non-zero coefficient or escape palette, step S714 or step S710 and step S712 are only proceeded for the current split node when there is at least one non-zero coefficient or escape palette in the current split node.

In an example of the special case, the current split node is a first or third split node partitioned from a parent node by TT splitting, and the depth of the current split node is larger than the maximum delta QP signaling depth but a depth of a second split node partitioned from the same parent node is equal to the maximum delta QP signaling depth, the delta QP derived from the syntax elements is shared by all three split nodes partitioned form the parent node. In another example of the special case, at most one delta QP is derived for all children nodes partitioned from the current split node by TT splitting if the depth of the current split node is smaller than the maximum delta QP signaling depth and a depth of at least one children node partitioned from the current split node is larger than the maximum delta QP signaling depth. The delta QP is shared by all the children nodes partitioned for the current split node in this example.

Although the previous embodiments and examples are decoding methods implemented in video decoding systems, embodiments of the present invention may also be applied to video encoding systems. An encoding method includes receiving input video data and partitioning the video data into leaf CU according to a CU partitioning structure such as QTBT or MTT. Some steps in the encoding method are equivalent to the steps in the decoding method, for example, the encoding method also includes determining a depth of a current split node according to a splitting type and comparing the depth with a maximum delta QP signaling depth. According to a comparing result, a QP is determined for the current split node. For example, if the current split node is a leaf CU, a previous coded QP is used if the depth of the current split node is larger than the maximum delta QP signaling depth; else a new QP is determined as the QP for the current split node. A delta QP is derived from the QP and a reference QP if the new QP is determined for the current split node, and then one or more syntax elements related to this delta QP is signaled in a TU associated with the current split node, such that the decoder can parse the one or more syntax elements to derive the delta QP. The encoding method includes encoding the current split node using the QP in the quantization process.

QP Signaling for Separate Luma and Chroma CU Partitioning Structures Dual tree coding is enabled to allow separate CU partitioning structures to split video data of a luma component and chroma components. The above QP signaling or deriving methods for the luma component can be extended to QP signaling or deriving for chroma components. In one embodiment, part of or all of parameters related to delta QP signaling including one or more thresholds, decision results, control flags from parent nodes, conditions, and a minimum delta QP signaling CU area or depth such as MinCuQpDeltaArea are duplicated for luma and chroma components. One set is used for the luma component while the other is used for the chroma components. The thresholds and the conditions can be the same in these two sets or can be different according to different color components.

In some embodiments of employing dual tree coding for the luma and chroma components, delta QP signaling is skipped for the chroma components. For example, chroma delta QP signaling is replaced by chroma QP offset signaling. Similar to the previous described delta QP signaling method for the luma component, chroma QP offsets may be signaled when a depth of a chroma block is smaller than or equal to a threshold for QP signaling. In an embodiment, the depth is derived by an area, and the threshold for QP signaling is also derived by a depth, for example a maximum QP signaling depth for the chroma components. Some embodiments of the present invention reuse a corresponding luma QP for the chroma components when delta QP signaling is skipped for the chroma components. That is, only one delta QP is signaled or parsed for the luma component and a QP for the luma component is determined according to the delta QP. A chroma delta QP is derived from the delta QP of a collocated luma block according to one embodiment, and a chroma QP is derived from the QP of a collocated luma block according to another embodiment. An embodiment of reusing luma delta QP or luma QPs for the chroma components enables or disables reusing at a sequence, picture, tile, or slice level, and separate delta QPs are signaled or parsed for the luma and chroma components if reusing is disabled.

In some embodiments of reusing a corresponding luma QP for chroma components, chroma QP offsets are signaled instead of chroma delta QPs, where chroma QP offset signaling for the chroma components may be similar to delta QP signaling for the luma component. A chroma QP offset is a difference between a chroma QP of a current chroma block and a reference luma QP. Since two separate CU partitioning structures are used to split the video data of luma and chroma components when dual tree coding is enabled, different splitting methods may be used to split luma and chroma CTBs belong to the same CTU. For example, a luma CTB is first partitioned by QT splitting, and then the two top QT partitions are further split by vertical BT splitting; however, corresponding chroma CTBs are partitioned only by vertical BT splitting. In this example of dual tree coding, each chroma leaf CB corresponds to three luma leaf CBs instead of one luma leaf CB, and since each of the three luma leaf CBs may have its own QP, one of the QPs is selected as the reference luma QP for deriving the chroma QP. Embodiments of the present invention determine the reference luma QP for a current chroma block by allocating a collocated luma block when dual tree coding is applied to split the luma and chroma components. The reference luma QP is a luma QP of a collocated luma block, such as a collocated CU, PU, or TU, or a luma QP of a collocated delta QP unit. Some examples of the collocated luma block include a block, CU, PU, or TU that covers a collocated sample of one predefined sample of the current chroma block. Examples of the predefined sample may be a top-left sample, top-right sample, bottom-left sample, bottom-right sample, or a center sample of the current chroma block. A final chroma QP is reconstructed by the signaled chroma QP offset and the reference luma QP obtained from the collocated luma block.

In some other embodiments, two separate delta QPs are signaled for the luma and chroma components respectively. The syntax element for defining the threshold for delta QP signaling, such as a minimum delta QP signaling CU area MinCuQpDeltaArea, or Log 2 value of the minimum area or minimum size, Log 2MinCuQpDeltaArea or Log 2MinCuQpDeltaSize, can also be separately coded in a sequence, picture, tile, or slice level for the luma and chroma components. In one embodiment, a chroma delta QP or a chroma QP of a chroma block is predicted from a luma delta QP or a luma QP of a collocated luma block. Syntax tables shown in Table 6 illustrate an example of separate delta QP signaling for luma and chroma components when dual tree coding is employed.

TABLE 6

| coding_tree_unit( ) { | Descriptor |
|---|---|
| xCtb = ( CtbAddrInRs % PicWidthInCtbsY ) << CtbLog2SizeY<br>yCtb = ( CtbAddrInRs / PicWidthInCtbsY ) << CtbLog2SizeY<br>if( slice type = = I && qtbtt_dual_tree_intra_flag ) {<br>dual_tree_implicit_qt_split ( xCtb, yCtb, CtbLog2SizeY, 0, 1, 1)<br>else<br>coding_quadtree( xCtb, yCtb, CtbLog2SizeY, 0, SINGLE_TREE, 1)<br>} | |

| dual_tree_implicit_qt_split( x0, y0, log2Cb Size, cqtDepth,<br>qtResetQpDeltaCoded,<br>qtResetQpDeltaCodedChroma) { | Descriptor |
|---|---|
| if (cu_qp_delta_enabled_flag && qtResetQpDeltaCoded) {<br>IsCuQpDeltaCoded = 0<br>CuQpDeltaVal = 0<br>}<br>if (cu_qp_delta_enabled_flag && qtResetQpDeltaCodedChroma) {<br>IsCuQpDeltaCodedChroma = 0<br>CuQpDeltaValChroma = 0<br>}<br>if( log2Cb Size > 6) {<br>x1 = x0 + ( 1 << ( log2CbSize − 1 ) )<br>y1 = y0 + ( 1 << ( log2Cb Size − 1 ) )<br>qtResetQpDeltaCoded = (cbWidth*cbHeight/4 >= MinCuQpDeltaArea<br>&&<br>qtResetQpDeltaCoded) 1: 0<br>qtResetQpDeltaCodedChroma = (cbWidth*cbHeight/4 >=<br>MinCuQpDeltaAreaChroma<br>&& qtResetQpDeltaCodedChroma ) 1: 0<br>dual_tree_implicit_qt_split( x0, y0, log2CbSize − 1, cqtDepth + 1,<br>qtResetQpDeltaCoded, qtResetQpDeltaCodedChroma )<br>if( x1 < pic_width_in_luma_samples )<br>dual_tree_mplicit_qt_split( x1, y0, log2Cb Size −1, cqtDepth +1,<br>qtResetQpDeltaCoded, qtResetQpDeltaCodedChroma )<br>if( y1 < pic_height_in_luma_samples )<br>dual_tree_implicit_qt_split( x0, y1, log2CbSize − 1, cqtDepth + 1,<br>qtResetQpDeltaCoded, qtResetQpDeltaCodedChroma )<br>if( x1 < pic_width_in_luma_samples && y1 <<br>pic_height_in_luma_samples )<br>dual_tree_implicit_qt_split( x1, y1 log2CbSize − 1, cqtDepth + 1, | |

TABLE 6-continued

| | |
|---|---|
| qtResetQpDeltaCoded, qtResetQpDeltaCodedChroma )<br>} else {<br>coding_quadtree( x0, y0, log2Cb Size, cqtDepth,<br>DUAL_TREE_LUMA,<br>qtResetQpDeltaCoded )<br>coding_quadtree( x0, y0, log2Cb Size, cqtDepth,<br>DUAL_TREE_CHROMA,<br>qtResetQpDeltaCodedChroma )<br>}<br>} | |
| coding_quadtree( x0, y0, log2Cb Size, cqtDepth, treeType,<br>qtResetQpDeltaCoded) { | Des<br>criptor |
| if( ( ( ( x0 +( 1 << log2Cb Size) <= pic_width_in_luma_samples<br>) 1 : 0 ) +<br>( ( y0 +( 1 << log2CbSize ) <= pic_height_in_luma_samples<br>) 1 : 0 ) +<br>( ( ( 1 << log2Cb Size) <= MaxBtSizeY ) 1 : 0) ) >= 2 &&<br>log2Cb Size > MinQtLog2SizeY )<br>qt_split_cu_flag+ x0 ++ y0+<br>if (Cu qp delta enabled flag && qtResetQpDeltaCoded) {<br>IsCuQpDeltaCoded = (treeType != DUAL_TREE_CHROMA) 0 :<br>IsCuQpDeltaCoded<br>CuQpDeltaVal = (treeType != DUAL TREE CHROMA) 0 :<br>CuQpDeltaVal<br>IsCuQpDeltaCodedChroma = (treeType = = DUAL_TREE_CHROMA)<br>0<br>IsCuQpDeltaCodedChroma<br>CuQpDeltaValChroma = (treeType = = DUAL_TREE_CHROMA) 0:<br>CuQpDeltaValChroma<br>}<br>if( qt_split_cu_flag[ x0 ][ y0 ] ) {<br>x1 = x0 +( 1 << ( log2Cb Size – 1 ) )<br>y1 = y0 +( 1 << ( log2Cb Size – 1 ) )<br>qtResetQpDeltaCoded = (cbWidth*cbHeight/4 >=<br>((treeType != DUAL_TREE_CHROMA) MinCuQpDeltaArea :<br>MinCuQpDeltaAreaChroma)) qtResetQpDeltaCoded) 1: 0<br>coding quadtree( x0, y0, log2Cb Size – 1, cqtDepth +1, treeType,<br>qtResetQpDeltaCoded)<br>if( x1 < pic_width_in_luma_samples )<br>coding quadtree( x1, y0, log2Cb Size – 1, cqtDepth + 1, treeType,<br>qtResetQpDeltaCoded)<br>if( y1 < pic_height_in_luma_samples )<br>coding quadtree( x0, y1, log2Cb Size – 1, cqtDepth + 1, treeType,<br>qtResetQpDeltaCoded )<br>if( x1 < pic_width_in_luma_samples && y1 <<br>pic_height_in_luma_samples )<br>coding_quadtree( x1, y1, log2Cb Size – 1, cqtDepth + 1, treeType,<br>qtResetQpDeltaCoded )<br>} else {<br>mttResetQpDeltaCoded = ((cbWidth*cbHeight >= ((treeType !=<br>DUAL_TREE_CHROMA) MinCuQpDeltaArea :<br>MinCuQpDeltaAreaChroma)) &&<br>qtResetQpDeltaCoded) 1 : 0<br>multi_type_tree( x0, y0, 1 << log2Cb Size, 1 << log2Cb Size, 0, 0, 0, treeTy<br>pe,<br>mttResetQpDeltaCoded)<br>}<br>} | ae(v) |
| multi_type_tree( x0, y0, cbWidth, cbHeight, mttDepth, depthOffset, partIdx, tre<br>eType, mttResetQpDeltaCoded ) { | Des<br>criptor |
| if( ( allowSplitBtVer || allowSplitBtHor || allowSplitTtVer ||<br>allowSplitTtHor ) &&<br>( x0 +cbWidth <= pic_width_in_luma_samples ) &&<br>(y0 +cbHeight <= pic_height_in_uma_samples ) )<br>mtt_split_cu_flag<br>if (cu_qp_delta_enabled_flag && mttResetQpDeltaCoded ) {<br>IsCuQpDeltaCoded = (treeType != DUAL_TREE_CHROMA) 0 :<br>IsCuQpDeltaCoded<br>CuQpDeltaVal = (treeType != DUAL_TREE_CHROMA) 0 : CuQpDeltaVal<br>IsCuQpDeltaCodedChroma = (treeType = = DUAL_TREE_CHROMA) 0:<br>IsCuQpDeltaCodedChroma<br>CuQpDeltaValChroma = (treeType = = DUAL_TREE_CHROMA) 0 :<br>CuQpDeltaValChroma<br>}<br>if( mtt_split_cu_flag ) {<br>if( ( allowSplitBtHor || allowSplitTtHor ) && | ae(v) |

TABLE 6-continued

```
( allowSplitBtVer || allowSplitTtVer ) )
mtt_split_cu_vertical_flag                                              ae(v)
if( ( allowSplitBtVer && allowSplitTtVer && mtt_split_cu_vertical_flag)
||
( allowSplitBtHor && allowSplitTtHor && !mtt_split_cu_vertical_flag ) )
mtt_split_cu_binary_flag                                                ae(v)
if( MttSplitMode[ x0 ][ y0 ][ mttDepth ] = = SPLIT_BT_VER) {
depthOffset += ( x0 + cbWidth > pic_width_in_luma_samples ) 1 : 0
x1 = x0 +( cbWidth / 2 )
mttResetQpDeltaCoded = ((cbWidth*cbHeight/2 >= ((treeType !=
DUAL_TREE_CHROMA) MinCuQpDeltaArea
MinCuQpDeltaAreaChroma)) && mttResetQpDeltaCoded ) 1: 0
multi type tree( x0, y0, cbWidth / 2, cbHeight, mttDepth + 1, depthOffset, 0,
tree
Type,
mttResetQpDeltaCoded)
if( x1 < pic_width_in_luma_samples )
multi_type_tree( x1, y0, cbWidth / 2, cbHeightY, mttDepth + 1, depthOffset, 1,
tre
eType,
mttResetQpDeltaCoded)
} else if( MttSplitMode[ x0 ][ y0 ][ mttDepth+ = = SPLIT_BT_HOR ) {
depthOffset + = (yo +cbHeight > pic_height_in_luma_samples ) 1 : 0
y1 = y0 +( cbHeight / 2 )
mttResetQpDeltaCoded = ((cbWidth*cbHeight/2 >= ((treeType !=
DUAL_TREE_CHROMA) MinCuQpDeltaArea :
MinCuQpDeltaAreaChroma)) && mttResetQpDeltaCoded ) 1: 0
multi_type_tree( x0, y0, cbWidth, cbHeight / 2, mttDepth + 1, depthOffset, 0,
tree
Type,
mttResetQpDeltaCoded)
if( y1 < pic_height_in_luma_samples )
multi_type_tree( x0, y1, cbWidth, cbHeight / 2, mttDepth + 1, depthOffset, 1,
tree
Type,
mttResetQpDeltaCoded)
} else if( MttSplitMode[ x0 ][ y0 ][ mttDepth+ = = SPLIT_TT_VER) {
x1 = x0 + ( cbWidth / 4 )
x2 = x0 + ( 3 * cbWidth / 4 )
mttResetQpDeltaCoded = ((cbWidth*cbHeight/4 >= ((treeType !=
DUAL_TREE_CHROMA) MinCuQpDeltaArea :
MinCuQpDeltaAreaChroma)) && mttResetQpDeltaCoded ) 1: 0
multi_type_tree( x0, y0, cbWidth / 4, cbHeight, mttDepth + 1, depthOffset, 0,
tree
Type,
mttResetQpDeltaCoded)
multi_type_tree( x1, y0, cbWidth / 2, cbHeight, mttDepth + 1, depthOffset, 1,
tree
Type,
mttResetQpDeltaCoded)
multi_type_tree( x2, y0, cbWidth / 4, cbHeight, mttDepth + 1, depthOffset, 2,
tree
Type,
mttResetQpDeltaCoded)
} else {/* SPLIT TT HOR */
y1 = y0 + ( cbHeight / 4 )
y2 = y0 + ( 3 * cbHeight / 4)
mttResetQpDeltaCoded = ((cbWidth*cbHeight/4 >= ((treeType !=
DUAL_TREE_CHROMA) MinCuQpDeltaArea :
MinCuQpDeltaAreaChroma)) && mttResetQpDeltaCoded ) 1: 0
multi_type_tree( x0, y0, cbWidth, cbHeight / 4, mttDepth + 1, depthOffset, 0,
tree
Type,
mttResetQpDeltaCoded)
multi_type_tree( x0, y1, cbWidth, cbHeight / 2, mttDepth + 1, depthOffset, 1,
tree
Type,
mttResetQpDeltaCoded )
multi_type_tree( x0, y2, cbWidth, cbHeight / 4, mttDepth + 1, depthOffset, 2 ,
tree
Type,
mttResetQpDeltaCoded)
}
} else
coding unit( x0, y0, cbWidth, cbHeight, treeType )
}
```

The syntax elements of chroma delta QP signaling at the TU level can be similar to the syntax elements of HEVC used for luma delta QP signaling, and is shown in the following:

```
if ( cu_qp_delta_enabled_flag && !IsCuQpDeltaCoded ) {
    cu_qp_delta_abs
    if( cu_qp_delta_abs )
        cu_qp_delta_sign_flag
}
```

A chroma delta QP value CuQpDeltaVal is derived based on an absolute variable cu_qp_delta_abs and a sign flag cu_qp_delta_sign_flag. A final chroma QP is reconstructed according to a reference chroma QP and CuQpDeltaVal. The sign flag cu_qp_delta_sign_flag is inferred to be 0 if it is not present. When the absolute variable cu_qp_delta_abs is present, the variables IsCuQpDeltaCoded is set to 1 and the chroma delta QP value CuQpDeltaVal is derived as follows:

IsCuQpDeltaCoded=1

CuQpDeltaVal=cu_qp_delta_abs*(1-2*cu_qp_delta_sign_flag)

The function of computing a chroma delta QP is called when the tree type is dual tree and there is at least one non-zero coefficient in the chroma TU. Exemplary syntax tables are shown in Table 7.

TABLE 7

| transform_unit( x0, y0, tbWidth, tbHeight, treeType) { | Descriptor |
|---|---|
| if( treeType = = SINGLE_TREE \|\| treeType = = DUAL_ TREE_LUMA ) | |
| tu_cbf_luma[ x0 ][ y0 ] | ae(v) |
| if( treeType = = SINGLE_TREE \|\| treeType = = DUAL_TREE_CHROMA ) { | |
| tu_cbf cb[ x0 ][ y0 ] | ae(v) |
| tu_cbf cr[ x0 ][ y0 ] | ae(v) |
| } | |
| if( (treeType = = SINGLE_TREE && (tu_cbf_luma[ x0 ][ y0 ] \|\| tu_cbf_cb[ x0 ][ y0 ] \|\| tu_cbf_cr[ x0 ][ y0]) ) \|\| (treeType = = DUAL_TREE_LUMA && tu_cbf_luma[ x0 ][ y0 ]) ) | |
| delta_qp( ) | |
| if( (treeType = = DUAL_TREE_CHROMA && ( tu_cbf_cb[ x0 ][ y0 ] \|\| tu_cbf_cr[ x0 ][ y0 ]) ) | |
| chroma_delta_qp( ) | |
| delta qp( ) { | |
| if( cu_qp_delta_enabled_flag && !IsCuQpDeltaCoded ) | |
| cu_qp_delta_abs | ae(v) |
| if( cu_qp_delta_abs ) | |
| cu_qp_delta_sign_flag | ae(v) |
| } | |
| } | |
| chroma_delta_qp( ) { | |
| if( cu_qp_delta_enabled_flag && !IsCuQpDeltaCodedChroma) { | |
| cu_chroma_qp_delta_abs | ae(v) |
| if( cu_chroma_qp_delta_abs ) | |
| cu_chroma_qp_delta_sign_flag | ae(v) |
| } | |
| } | |

Other methods of chroma delta QP signaling at the TU level can also be applied instead of the existing HEVC signaling method. The above described chroma delta QP signaling can be replaced by chroma QP offset signaling and a flag, IsCuQpDeltaCodedChroma is replaced by IsCuChromaQpOffsetCoded, and an example of signaling a chroma QP offset at the TU level is shown in syntax tables of Table 8.

TABLE 8

| transform_unit( x0, y0, tbWidth, tbHeight, treeType) { | Descriptor |
|---|---|
| if( treeType ==SINGLE TREE \|\| treeType == DUAL_TREE_LUMA ) | |
| tu_cbf luma[ x0 ][ y0 ] | ae(v) |
| if( treeType = = SINGLE_TREE \|\| treeType = = DUAL_TREE_CHROMA ) { | |
| tu_cbf_cb[ x0 ][ y0 ] | ae(v) |
| tu_cbf_cr[ x0 ][ y0 ] | ae(v) |
| } | |
| if( (treeType = = SINGLE_TREE && (tu_cbf_luma[ x0 ][ y0 ] \|\| tu_cbf_cb[ x0 ][ y0 ] \|\| tu_cbf_cr[ x0 ][ y0]) ) \|\| (treeType = = DUAL_TREE_LUMA && tu_cbf_luma[ x0 ][ y0 ]) ) | |
| delta_qp( ) | |
| if( (treeType = = DUAL_TREE_CHROMA && ( tu_cbf_cb[ x0 ][ y0 ] \|\| tu_cbf_cr[ x0 ][ y0 ]) ) | |
| chroma_qp_offset ( ) | |
| chroma_qp_offset( ) { | |
| if( cu_chroma_qp_offse_enabled_flag && !IsCuChromaQpOffsetCoded ) { | |
| cu_chroma_qp_offset_flag | ae(v) |
| if( cu_chroma_qp_offset_flag && chroma_qp_offset_list_len_minus1 >0 ) | |
| cu_chroma_qp_offset_idx | ae(v) |
| } | |
| } | |

In this embodiment, a chroma QP offset of a current chroma block is derived from one or more syntax elements signaled in a TU associated with the current chroma block when the TU has at least one non-zero coefficient for the chroma components. The example shown in Table 7 checks if any of the chroma Cb and Cr components has at least one non-zero coefficient, and a chroma QP offset is signaled when there is at least one non-zero coefficient for the chroma components.

In one embodiment, chroma QP signaling and associated IsCuChromaQpOffsetCoded and MinCuQpDeltaAreaChroma derivation and operation, are used for signaling chroma QP offsets if share tree coding is applied. Chroma QP signaling is used for chroma delta QP signaling if separate tree coding is applied. In another embodiment, regardless the CU partitioning structures for luma and chroma components are dual tree or share tree coding, the above chroma QP signaling is used to signal chroma delta QPs. That is, separate delta QPs for the luma and chroma components not only applied to dual tree coding but is also applied to share tree coding where a CU partitioning structure is shared between the luma and chroma components.

In yet another embodiment, regardless the CU partitioning structures for luma and chroma components are dual tree or share tree coding, the above chroma QP signaling is used to signal chroma QP offsets. In the cases when transform and quantization are bypassed, that is when a flag cu_transquant_bypass_flag is true, delta QP and/or chroma QP offset signaling can be skipped.

In some embodiments of chroma delta QP signaling, a flag, diff_cu_qp_delta_depth c, is signaled to specify a difference between a chroma coding tree block size and a minimum chroma coding block size of coding units for chroma delta QP signaling. Similar to luma delta QP signaling, a chroma delta QP may be derived from syntax elements cu_qp_delta_abs and cu_qp_delta_sign_flag for the chroma components. The value of this flag diff_cu_qp_delta_depth c is limited to be within a range between 0 to log 2_diff_max_min_luma_coding_block_size inclusively. When this flag is not present, the value is inferred to be equal to 0, which means the minimum size for chroma delta QP signaling is equal to the chroma coding tree block size.

In one embodiment, a flag is signaled to indicate whether the minimum size for chroma delta QP signaling, represented by MinCuQpDeltaAreaC or Log 2MinCuQpDeltaAreaC, is in the same ratio with the chroma sub-sampling ratio. For example, in a 4:2:0 color format, this flag indicates whether MinCuQpDeltaAreaC for the chroma components is one-quarter of MinCuQpDeltaArea for the luma component, or whether Log 2MinCuQpDeltaAreaC is Log 2MinCuQpDeltaArea-2.

In another embodiment, three separate delta QPs are signaled for each of three color components, luma Y, chroma Cb, and chroma Cr when applicable. For example, three delta QPs are signaled for the three color components when ChromaArrayType is greater than 0.

Figure 8:
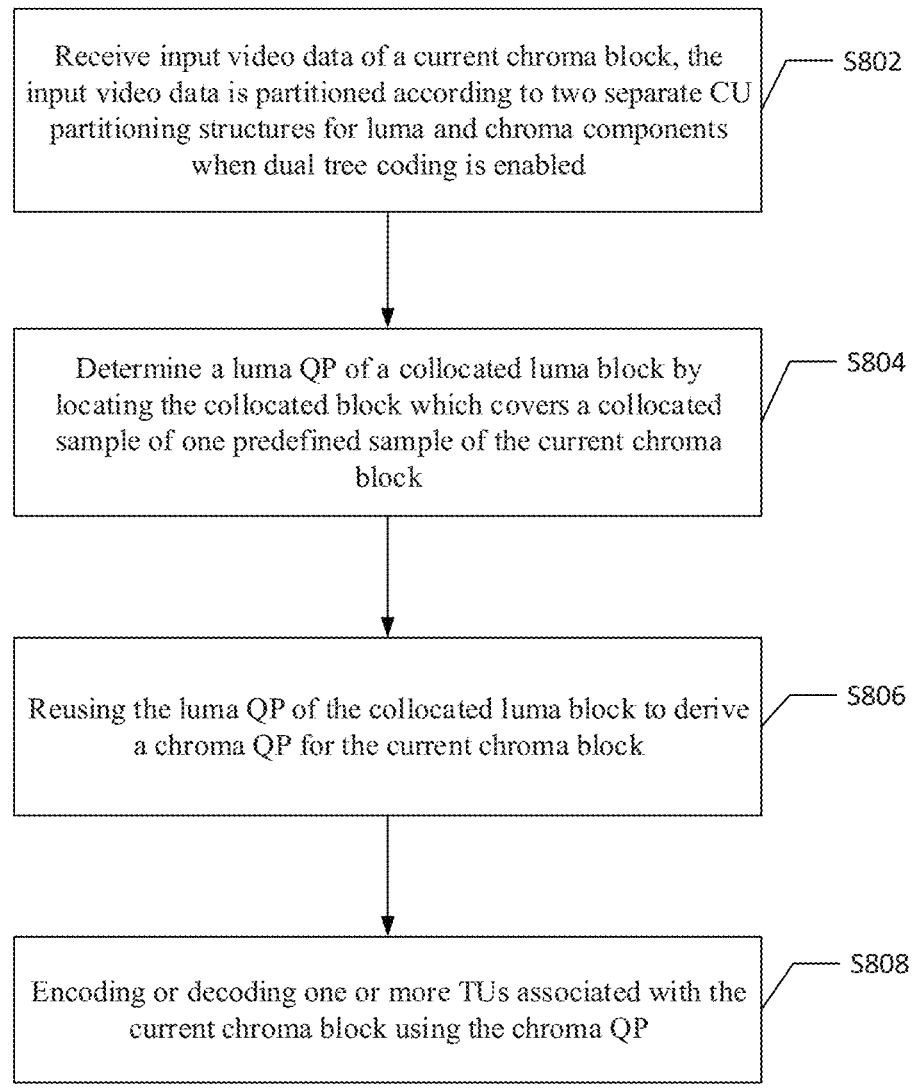
FIG. 8 is a flowchart of processing video data by reusing a luma QP of a collocated luma block for a chroma block according to embodiments of the present invention.

Representative Flowchart of Reusing Luma QP for Chroma FIG. 8 is a flowchart illustrating an embodiment of video data processing in a video encoding or decoding system reuses a luma QP for a current chroma block. The current chroma block may be a chroma CB in a leaf CU or non-leaf CU. The video encoding or decoding system receives input video data of a current chroma block in step S802. The input video data is partitioned according to two separate CU partitioning structures for luma and chroma components when dual tree coding is enabled. A luma QP of a collocated luma block is determined in step S804 by locating a collocated block which covers a collocated sample of one predefined sample of the current chroma block. Some examples of the collocated luma block include a collocated CU, PU, TU, or delta QP unit of the current chroma block. Some examples of the predefined sample of the current chroma block include a top-left sample, top-right sample, bottom-left sample, bottom-right sample, or a center sample of the current chroma block. In step S806, this luma QP of the collocated luma block is reused to derive a chroma QP for the current chroma block. For example, the chroma QP is derived by the luma QP and a chroma QP offset determined from one or more syntax elements signaled in a TU associated with the current chroma block. The chroma QP offset may be signaled by using a similar method as the previously described delta QP signaling method for the luma component, for example, the chroma QP offset is derived for the current chroma block when a depth of the current chroma block is smaller than or equal to a threshold for QP signaling. Chroma QP offsets and luma delta QPs are separately signaled when dual tree coding is enabled as chroma QGs for sharing chroma QP offsets may be different from luma QGs for sharing delta QP. The area of the current chroma block and the threshold for QP signaling may be derived by depths. One or more TUs associated with the current chroma block are encoded or decoded using the chroma QP in step S808.

Reference QP Derivation It is difficult to identify a Quantization Group (QG) of a current coding block and a previous quantization group in a decoding order when deriving a reference QP for a coding block under multi-type tree partitioning. In one embodiment, a slice QP is always used as a reference QP for blocks partitioned by a QTBT or MTT partitioning structure. In another embodiment, a slice QP is used as a reference QP for a BT or QT partition, but in the case of a QT partition, the method in HEVC is used to derive the reference QP. In yet another embodiment, the QP of a previous quantization group in a decoding order is not used as a reference, the QP of a neighboring coding quantization group is used or a slice QP is used if the neighboring coding quantization group is not available. In yet another embodiment, the QP of a previous quantization group in a decoding order is not used as a reference, but a last coded QP in a last CTU is used if a neighboring coding quantization group is not available. In the case when the last coded QP in the last CTU is not available as well, a slice QP is used.

In some other embodiments, a reference QP is derived according to the availability of a left QP and an above QP. For example, an average value of a left QP and an above QP is used as a reference QP if the left and above QPs are both available, otherwise the left QP is used as the reference QP if the left QP is available or the above QP is used as the reference QP if the above QP is available. If none of the left and above QPs is available, a slice QP is used as the reference QP. In another example, a left QP is first checked and used as a reference QP if it is available, otherwise an above QP is used as the reference QP if it is available, and a slice QP is used as the reference QP if both the left and above QPs are not available. In yet another example, an above QP is first checked and used as a reference QP if it is available, otherwise a left QP is used as the reference QP if it is available, and a slice QP is used as the reference QP if both the left and above QPs are not available.

In one embodiment, the availability of a neighboring coding QG is depending on a CTU address. A neighboring coding QG is available if the neighboring coding QG and a current coding QG are in the same CTU; otherwise the neighboring coding QG is not available. In another embodiment, the availability of a neighboring coding QG is depending on a CTU row address. For example, a neighboring coding QG is available if the neighboring coding QG and a current coding QG are in the same CTU row; otherwise, the neighboring coding QG is not available. In one embodiment, a reference QP is derived for a QG. At most one delta QP can be signaled in a QG. The size or shape of a QG can be non-square. A QG might contain one or more CUs. An encoding or decoding order of the CUs in a QG is continuous. When a video decoding system is decoding CUs in a QG, if there is no non-zero residual nor palette escape value in a CU and a delta QP is not signaled in this QG, the QP of this CU is set as the reference QP. If the CU has at least one non-zero residual or at least one palette escape value, and a delta QP is not yet signaled in this QG, the delta QP is signaled. A reconstructed QP is derived from the reference QP and the delta QP. The reconstructed QP is used for this CU and all the rest CUs in this QG. If a CU has at least one non-zero residual or at least one palette escape value, and a delta QP is already signaled in this QG, the delta QP is not signaled.

Quantization Group Partitioning or Determination There are three schemes, scheme A, scheme B, and scheme C, explained in the following for Quantization Group (QG) partitioning or determination. A threshold for QP signaling MinCuQpDeltaArea is specified to determine a QG. A QG represents a region, node, or leaf CU with a variable IsCuQpDeltaCoded equal to 0.

Scheme A In an example of scheme A, for a current split node with a size larger than or equal to the threshold MinCuQpDeltaArea, the variable IsCuQpDeltaCoded is set to 0 for the current split node, and for a current split node with a size smaller than MinCuQpDeltaArea and the size of a parent node is larger than MinCuQpDeltaArea, the variable IsCuQpDeltaCoded is set to 0 for the current split node. If the size of a current split node is smaller than MinCuQpDeltaArea and the size of a parent node is equal to or smaller than MinCuQpDeltaArea, IsCuQpDeltaCoded is not set to 0. In another example, if the size of a current split node is equal to or smaller than MinCuQpDeltaArea and the size of its parent node is larger than MinCuQpDeltaArea, the variable IsCuQpDeltaCoded is set to 0 for the current split node. In yet another example, for a current split node partitioned from a parent node with a size larger than MinCuQpDeltaArea, the variable CuQpDeltaCoded is set to 0 for the current node.

In another example of scheme A, if the size of a current split node is larger than MinCuQpDeltaArea and the size of one of the children nodes is larger than or equal to MinCuQpDeltaArea, the variable IsCuDeltaCoded is set to 0 for all children nodes; otherwise, the variable IsCuDeltaCoded is not set to 0 for all children nodes if the current split node is smaller than or equal to MinCuQpDeltaArea or the sizes of all the children nodes are smaller than MinCuQpDeltaArea. In another example, if the size of a current split node is larger than MinCuQpDeltaArea, the variable IsCuQpDeltaCoded is set to 0 for all children nodes; otherwise, the variable IsCuQpDeltaCoded is not set to 0 for all the children nodes if the current split node is smaller than or equal to MinCuQpDeltaArea.

The above examples of scheme A may be described by the concept of QG determination. In an example, for a leaf CU with a size larger than or equal to MinCuQpDeltaArea, the leaf CU is a QG. For a leaf CU with a size smaller than MinCuQpDeltaArea and the size of its parent CU is larger than MinCuQpDeltaArea, the leaf CU is a QG. For a non-leaf CU or a current node, if the size of the non-leaf CU or current node is equal to MinCuQpDeltaArea, this non-leaf CU or the current node is a QG. For a non-leaf CU or a current node, if its size is smaller than MinCuQpDeltaArea and the size of its parent CU or parent node is larger than MinCUQpDeltaArea, this non-leaf CU or current node is a QG. Otherwise, this leaf CU or this non-leaf CU or current node is not a QG.

In another example, for a leaf CU with a size larger than or equal to MinCuQpDeltaArea, the leaf CU is a QG, or if the size is smaller than MinCuQpDeltaArea and the size of its parent CU is larger than MinCuQpDeltaArea, the leaf CU is a QG; otherwise, this leaf CU is not a QG. For a non-leaf CU, it its size is equal to MinCuQpDeltaArea, or if its size is smaller than MinCuQpDeltaArea and the size of its parent CU is larger than MinCuQpDeltaArea, this non-leaf CU is a QG; otherwise, this non-leaf CU is not a QG.

In another example of scheme A, for a current node with a size equal to or smaller than MinCuQpDeltaArea, and its parent node is not a QG, the current node is a QG. For a leaf CU, if its size is larger than or equal to MinCuQpDeltaArea, the leaf CU is a QG. In another example, for a current node with a size equal to or smaller than MinCuQpDeltaArea, and its parent is not a QG, the current node is a QG. For a leaf CU, if its parent node is not a QG, the leaf CU is a QG.

For a QG, the variable IsCuQpDeltaCoded is set to 0. A reference QP or so called a predictive QP is derived for this QG. For example, the variable IsCuQpDeltaCoded is set to 0 for a QG and a position of this QG is stored, an example of the position is a top-left position of the QG. The stored position can be used to derive the reference QP. In another example, for a QG, the variable IsCuQpDeltaCoded is set to 0 and a reference QP is derived. In another example, the variable IsCUQpDeltaCoded is set to 0 at the first leaf CU in a QG, and a reference QP is derived at the first leaf CU in the QG.

In scheme A, if the size of a current CU or node is equal to 2*MinCuQpDeltaArea and QT splitting or TT splitting is applied to split the current CU or node, each children node is a QG. The variable IsCuQpDeltaCoded is set to 0 for all children nodes. If the size of a current CU or node is equal to MinCuQpDeltaArea, the current CU or node is a QG. The variable IsCuQpDeltaCoded is set to 0 for the current CU or node. If the size of a current leaf CU is larger than MinCuQpDeltaArea, the current leaf CU is a QG. The variable IsCuQpDeltaCoded is set to 0 for the current leaf CU. If the size of a current CU or node is larger than or equal to MinCuQpDeltaArea, the variable IsCuQpDeltaCoded is set to 0 for the current CU or node.

Scheme B In scheme B of QG determination, some embodiments determines whether split nodes of a parent node are QGs at the parent node. An example of scheme B sets the variable IsCuQpDeltaCoded to 0 for all children nodes of a current node if the size of a smallest children node is larger than or equal to the threshold for QP signaling MinCuQpDeltaArea. In another example, the variable IsCuQpDeltaCoded is set to 0 for all children nodes of a current node if sizes of all the children nodes are larger than or equal to MinCuQpDeltaArea. In another example, the variable is set to 0 for all children nodes of a current node if sizes of all the children nodes are larger than or equal to MinCuQpDeltaArea; otherwise if the size of one children node is smaller than MinCuQpDeltaArea, the variable IsCuQpDeltaCoded is not set to 0 for all children nodes. None of the split nodes can set the variable IsCuQpDeltaCoded to 0.

A QG represents a region, node, or leaf CU with the variable IsCuQpDeltaCoded set to 0. In one example, a leaf CU is a QG if its size is larger than the threshold MinCuQpDeltaArea. In another example, a current split node is a QG if its size is larger than MinCuQpDeltaArea and the size of one children node of the current split node is smaller than MinCuQpDeltaArea. In another example, a current split node is a QG if the current split node has a size larger than MinCuQpDeltaArea and the size of one children node of the current split node is smaller than MinCuQpDeltaArea. For a current node, if sizes of all children nodes are larger than or equal to MinCuQpDeltaArea, the current split node is not a QG. In another example, a non-leaf CU is a QG if its parent node is not a QG and the size of one children node is smaller than MinCuQpDeltaArea. A leaf CU is a QG if its size is larger than or equal to MinCuQpDeltaArea and its parent node is not a QG.

In another example of Scheme B, a current split node is a QG if its parent node is not a QG and the size of one children node of the current split node is smaller than the threshold for QP signaling MinCuQpDeltaArea. For a leaf CU, if its size is larger than MinCuQPDeltaArea, the leaf CU is a QG. In another example, a current split node is a QG if its parent node is not a QG and the size of one children node is smaller than MinCuQpDeltaArea. For a leaf CU, if its size is larger than or equal to MinCuQpDeltaArea, and its parent node is not a QG, the leaf CU is a QG. In yet another example, a current split node is a QG if its parent node is not a QG and the size of one children node is smaller than MinCuQpDeltaArea. For a leaf CU, if its parent node is not a QG, the leaf CU is a QG.

For a QG, the variable IsCuQpDeltaCoded is set to 0. A reference QP or a predictive QP is derived for this QG. For example, the variable IsCuQpDeltaCoded is set to 0 and a position such as a top-left position of this QG is stored. The stored position can be used to derive a reference QP. In another example, the variable IsCuQpDeltaCoded is set to 0 and a reference QP is derived for a QG. In another example, the variable IsCuQpDeltaCoded is set to 0 at a first leaf CU in a QG, and a reference QP is derived at a first leaf CU in a QG.

In scheme B, a current split node is a QG if the current split node size is equal to two times the threshold Min-CuQpDeltaArea and QT or TT splitting is applied to partition the current split node. The variable IsCuQpDeltaCoded is set to 0 for the current split node. If a current leaf CU size is larger than MinCuQpDeltaArea, the current leaf CU is a QG, and the variable IsCuQpDeltaCoded is set to 0 for the current leaf CU.

Scheme C Scheme C is similar to scheme B, except when a current split node size is equal to two times the threshold MinCuQpDeltaArea and QT splitting is applied, a first two QT partitions will be grouped as a QG while a last two QT partitions will be grouped as another QG. For a QG, the variable IsCuQpDEltaCoded is set to 0 and a reference QP or predictive QP is derived for this QG. For example, for a QG, the variable IsCuQpDeltaCoded is set to 0 and a position, such as a top-left position, of this QG is stored. The stored position can be used to derive the reference QP. In another example, for a QG, the variable IsCuQpDeltaCoded is set to 0 and a reference QP is derived. In another example, the variable IsCuQpDeltaCode is set to 0 at a first leaf CU in a QG, and a reference QP is derived at a first leaf CU in a QG.

The concept of the QG partition methods can also be applied to share merge list, Merge Estimation Region (MER), or the intra share boundary prediction.

Embodiments of the present invention may be implemented in video encoders and/or video decoders. For example, the disclosed methods may be implemented in an entropy decoding module, a coefficient coding module, a quantization module, or a partition control module of a video encoder, and/or an entropy parser module, a coefficient decoding module, a de-quantization module, or a partition control module of a video decoder. Alternatively, any of the disclosed methods may be implemented as a circuit coupled to the entropy encoding module, a coefficient coding module, a quantization module, or the partition control module of the video encoder and/or the entropy parser module, a coefficient decoding module, a de-quantization module, or the partition control module of the video decoder, so as to provide the information needed by the entropy parser module or the partition control module. The video encoders have to follow the foregoing syntax design so as to generate a legal bitstream, and the video decoders are able to decode the bitstream correctly only if the parsing process is complied with the foregoing syntax design. When any syntax element is skipped in the bitstream, the video encoders and decoders set the value of the syntax element as an inferred value to guarantee the encoding and decoding results are matched.

Figure 9:
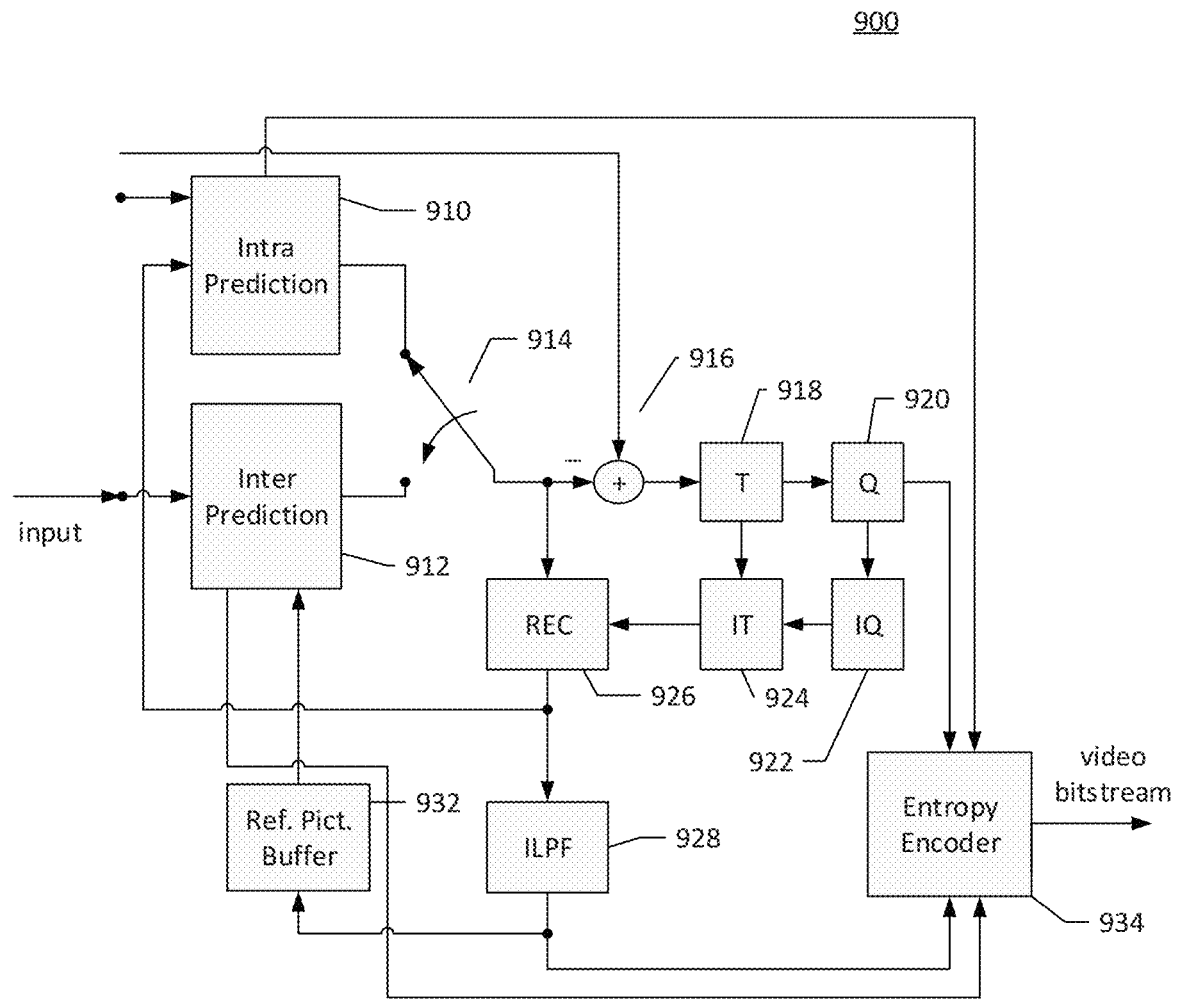
FIG. 9 illustrates an exemplary system block diagram for a video encoding system incorporating the video data processing method according to embodiments of the present invention.

FIG. 9 illustrates an exemplary system block diagram for a Video Encoder 900 implementing various embodiments of the present invention. Intra Prediction module 910 provides intra predictors based on reconstructed video data of a current picture. Inter Prediction module 912 performs Motion Estimation (ME) and Motion Compensation (MC) to provide inter predictors based on referencing video data from other picture or pictures. Either Intra Prediction module 910 or Inter Prediction module 912 supplies a selected predictor of a current block to Adder 916 to form residues by subtracting the selected predictor from original video data of the current block. The residues of the current block are further processed by Transformation module (T) 918 followed by Quantization module (Q) 920. The transformed and quantized residual signal is then encoded by Entropy Encoder 934 to form a video bitstream. In Quantization module 920, transformed luma residues of each quantization group are quantized by a luma QP, and the luma QP is determined from a delta QP. The delta QP is signaled based on a depth of a split node according to some embodiments of the present invention. The depth of the split node is depending on a splitting type. In some other embodiments, a luma QP of a collocated luma block is reused to derive a chroma QP for a chroma block, where the collocated luma block is a block covers a collocated sample of one predefined sample of the chroma block. The video bitstream is then packed with side information including the delta QP for each quantization group. The transformed and quantized residual signal of the current block is processed by Inverse Quantization module (IQ) 922 and Inverse Transformation module (IT) 924 to recover the prediction residues. As shown in FIG. 9, the residues are recovered by adding back to the selected predictor at Reconstruction module (REC) 926 to produce reconstructed video data. The reconstructed video data may be stored in Reference Picture Buffer (Ref. Pict. Buffer) 932 and used for prediction of other pictures. The reconstructed video data from REC 926 may be subject to various impairments due to the encoding processing, consequently, In-loop Processing Filter (ILPF) 928 is applied to the reconstructed video data before storing in the Reference Picture Buffer 932 to further enhance picture quality. Syntax elements are provided to Entropy Encoder 934 for incorporation into the video bitstream.

Figure 10:
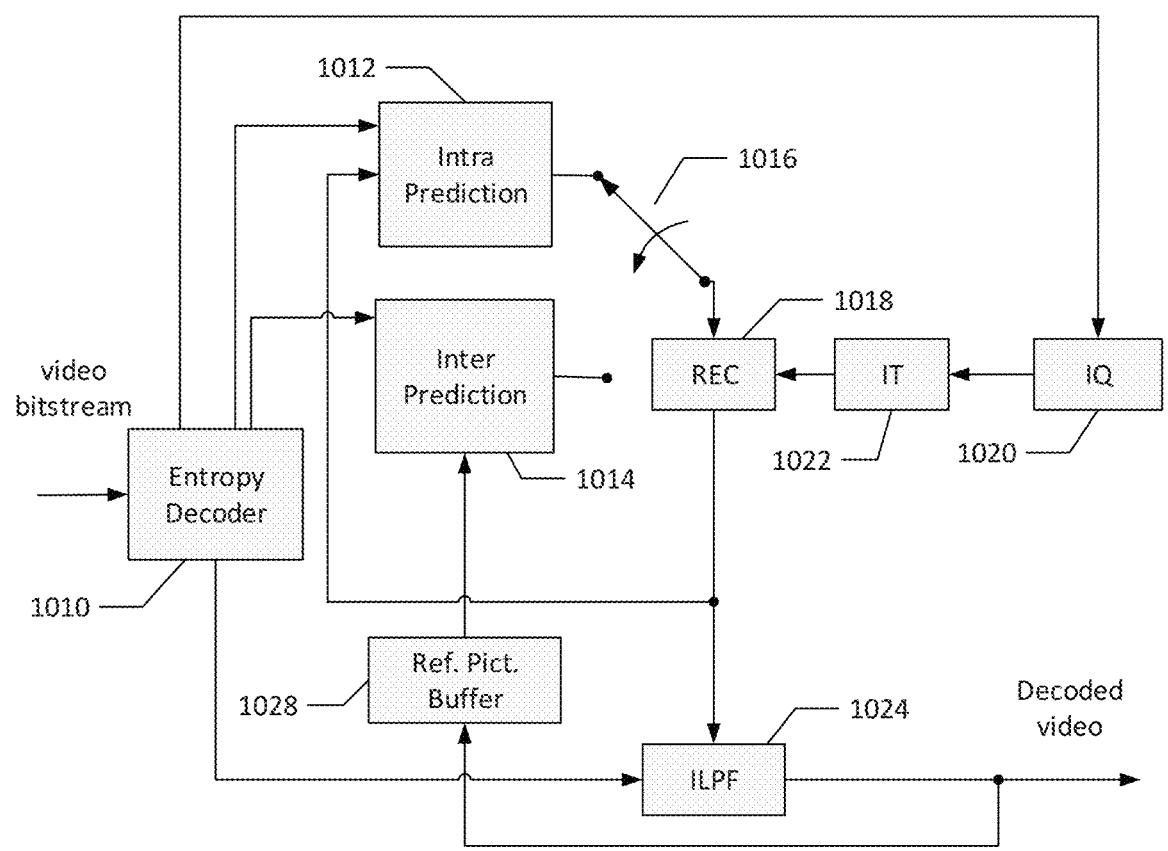
FIG. 10 illustrates an exemplary system block diagram for a video decoding system incorporating the video data processing method according to embodiments of the present invention.

A corresponding Video Decoder 1000 for Video Encoder 900 of FIG. 9 is shown in FIG. 10. The video bitstream encoded by a video encoder is the input to Video Decoder 1000 and is decoded by Entropy Decoder 1010 to parse and recover the transformed and quantized residual signal and other system information. Entropy Decoder 1010 parses one or more syntax elements of a delta QP for each quantization group, where delta QP signaling is depending on depths of split nodes. A depth of a split node partitioned by a splitting type is derived according to the splitting type. The decoding process of Decoder 1000 is similar to the reconstruction loop at Encoder 900, except Decoder 1000 only requires motion compensation prediction in Inter Prediction module 1014. Each block is decoded by either Intra Prediction module 1012 or Inter Prediction module 1014. Switch 1016 selects an intra predictor from Intra Prediction module 1012 or Inter predictor from Inter Prediction module 1014 according to decoded mode information. The transformed and quantized residual signal is recovered by Inverse Quantization module (IQ) 1020 and Inverse Transformation module (IT) 1022. IQ module 1020 is also called de-quantization module. By comparing a depth of a split node and a threshold for QP signaling, Inverse Quantization module 1020 determines a luma QP for the split node from the delta QP parsed by Entropy Decoder 1010 and a reference QP or determines a luma QP from a previous coded QP. According to some other embodiments, a chroma QP for a chroma block is determined from a luma QP of a collocated luma block, and the collocated luma block is a block that covers a collocated sample of one predefined sample of the current chroma block. The recovered residual signal is reconstructed by adding back the predictor in Reconstruction module 1018 to produce reconstructed video. The reconstructed video is further processed by In-loop Processing Filter (ILPF) 1024 to generate final decoded video. If the currently decoded picture is a reference picture, the reconstructed video of the currently decoded picture is also stored in Reference Picture Buffer (Ref. Pict. Buffer) 1028 for later pictures in decoding order.

Various components of Video Encoder 900 and Video Decoder 1000 in FIG. 9 and FIG. 10 may be implemented by hardware components, one or more processors configured to execute program instructions stored in a memory, or a combination of hardware and processor. For example, a processor executes program instructions to control receiving of input video data. The processor is equipped with a single or multiple processing cores. In some examples, the processor executes program instructions to perform functions in some components in Encoder 900 and Decoder 1000, and the memory electrically coupled with the processor is used to store the program instructions, information corresponding to the reconstructed images of blocks, and/or intermediate data during the encoding or decoding process. In some examples, Video Encoder 900 may signal information by including one or more syntax elements in a video bitstream, and corresponding Video Decoder 1000 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 9 and 10, Encoder 900 and Decoder 1000 may be implemented in the same electronic device, so various functional components of Encoder 900 and Decoder 1000 may be shared or reused if implemented in the same electronic device. For example, one or more of Reconstruction module 926, Inverse Transformation module 924, Inverse Quantization module 922, In-loop Processing Filter 928, and Reference Picture Buffer 932 in FIG. 9 may also be used to function as Reconstruction module 1018, Inverse Transformation module 1022, Inverse Quantization module 1020, In-loop Processing Filter 1024, and Reference Picture Buffer 1028 in FIG. 10, respectively.

Embodiments of the video data processing method with QP signaling depending on depths associated with the splitting type for video coding system or reusing luma QPs for chroma components may be implemented in a circuit integrated into a video compression chip or program code integrated into video compression software to perform the processing described above. For examples, determining of an area of a current split node or determining of a luma QP of a collocated luma block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video decoding system, wherein video data is partitioned into leaf Coding Units (CUs) according to a CU partitioning structure, the method comprising:
receiving input data associated with a current split node, wherein the current split node is partitioned from a parent node by a splitting type;
determining a depth of the current split node according to the splitting type;
determining a value of a variable by comparing the depth of the current split node with a maximum delta Quantization Parameter (QP) signaling depth;
deriving a delta QP from one or more syntax elements signaled or parsed in a Transform Unit (TU) associated with the current split node according to the value of the variable;
reconstructing a final QP for one or more TUs associated with the current split node based on a reference QP and the delta QP when the one or more syntax elements are signaled or parsed for the current split node; and
decoding the one or more TUs associated with the current split node using the final QP.

2. The method of claim 1, wherein the maximum delta QP signaling depth is predefined, derived, parsed or signaled in one or a combination of a slice, picture, tile, and sequence level.

3. The method of claim 1, wherein the depth of the current split node is determined by an area of the current split node and the maximum delta QP signaling depth is derived by a minimum delta QP signaling CU area.

4. The method of claim 3, wherein the area of the current split node is determined from a block width and a block height of the current split node, and the minimum delta QP signaling CU area is predefined, derived, parsed or signaled in one or a combination of a slice, picture, tile, and sequence level.

5. The method of claim 3, wherein the current split node is a leaf CU, and the delta QP is derived from the one or more syntax elements when the area of the current split node is larger than or equal to the minimum delta QP signaling CU area and there is at least one non-zero coefficient or at least one escape palette in the current split node.

6. The method of claim 3, wherein the current split node is not a leaf CU and is further partitioned into multiple leaf CUs, the delta QP is derived from the one or more syntax elements when the current split node has a size larger than or equal to the minimum delta QP signaling CU area, an area of at least one children node partitioned from the current split node is smaller than the minimum delta QP signaling CU area, and at least one of the leaf CUs in the current split node has at least one non-zero coefficient or at least one escape palette, wherein the delta QP is used by one or more of the leaf CUs within the current split node.

7. The method of claim 1, wherein the current split node is a leaf CU, the delta QP is derived from the one or more syntax elements when the depth of the current split node is smaller than or equal to the maximum delta QP signaling depth and the current split node has at least one non-zero coefficient or at least one escape palette.

8. The method of claim 1, wherein when the current split node is not a leaf CU and is further partitioned into multiple leaf CUs, the delta QP is derived from the one or more syntax elements when the depth of the current split node is smaller than or equal to the maximum delta QP signaling depth, a depth of at least one children node partitioned from the current split node is larger than the maximum delta QP signaling depth, and at least one of the leaf CUs in the current split node has at least one non-zero coefficient or at least one escape palette, wherein the delta QP is used by one or more of the leaf CUs within the current split node.

9. The method of claim 1, wherein the maximum delta QP signaling depth is signaled or parsed separately for luma and chroma components when separate CU partitioning structures are employed for partitioning the video data of the luma and chroma components.

10. The method of claim 1, wherein the depth of the current split node is a depth of the parent node plus 2 when the current split node is a first or third split node of Ternary Tree (TT) splitting, the depth of the current split node is a depth of the parent node plus 1 when the current split node is a second split node of TT splitting, the depth of the current split node is a depth of the parent node plus 1 when the current split node is partitioned from the parent node by Binary Tree (BT) splitting, and the depth of the current split node is a depth of the parent node plus 2 when the current split node is partitioned from the parent node by quadtree splitting.

11. The method of claim 1, wherein the current split node is further partitioned into multiple children nodes, wherein a depth of a children node is the depth of the current split node plus 2 when the children node is a first or third split node of Ternary Tree (TT) splitting, a depth of a children node is the depth of the current split node plus 1 when the child node is a second split node of TT splitting, a depth of a children node is the depth of the current split node plus 1 when the children node is partitioned from the current split node by Binary Tree (BT) splitting, and a depth of a children node is the depth of the current split node plus 2 when the children node is partitioned from the current split node by quadtree splitting.

12. The method of claim 1, wherein when the current split node is a first or third split node partitioned from the parent node by Ternary Tree (TT) splitting, the depth of the current split node is larger than the maximum delta QP signaling depth, a depth of a second split node partitioned from the parent node is equal to the maximum delta QP signaling depth, and the delta QP derived from the one or more syntax elements is used by one or more of the three split nodes partitioned from the parent node.

13. The method of claim 1, wherein a flag indicating whether the current split node is a first or third split node in Ternary Tree (TT) splitting, a flag indicating whether the current split node is a second split node in TT splitting, a parent CU size, or a combination thereof is also used to determine the value of the variable for the current split node.

14. The method of claim 1, wherein one or more delta QP related information is passed from the parent node to the current split node to determine the value of the variable for the current split node.

15. The method of claim 14, wherein the one or more delta QP related information includes a reset flag for the current split node, and the reset flag is determined by referring to the area, size, or depth of the current split node or the splitting type for partitioning the parent node.

16. The method of claim 1, wherein one or more delta QP related information is passed from the current split node to one or more children nodes partitioned from the current split node to determine the value of the variable for the one or more children nodes.

17. The method of claim 16, wherein the one or more delta QP related information includes a reset flag for the one or more children nodes, and the reset flag is determined by referring to an area, size, or depth of the one or more children nodes and a splitting type for partitioning the current split node.

18. The method of claim 17, wherein the reset flag is determined by comparing the depth of the current node plus a second variable with the maximum delta QP signaling depth, wherein the second variable is equal to 2 when the current split node is partitioned by Ternary Tree (TT) splitting or by quadtree splitting, the second variable is equal to 1 when the current split node is partitioned by Binary Tree (BT).

19. The method of claim 1, wherein at most one delta QP is derived for all children nodes partitioned from the current split node by Ternary Tree (TT) splitting when the depth of the current split node is smaller than or equal to the maximum delta QP signaling depth and a depth of at least one children node partitioned from the current split node is larger than the maximum delta QP signaling depth, and the delta QP derived from the one or more syntax elements is used by one or more of the children nodes partitioned from the current split node.

20. The method of claim 1, wherein the reference QP is a slice QP when the CU partitioning structure is a Quad-Tree-Binary-Tree (QTBT) or Multi-Type-Tree (MTT) partitioning structure.

21. An apparatus of processing video data in a video decoding system, wherein video data is partitioned into leaf Coding Units (CUs) according to one or more CU partitioning structures, the apparatus comprising one or more electronic circuits configured for:
receiving input data associated with a current split node, wherein the current split node is partitioned from a parent node by a splitting type;
determining a depth of the current split node according to the splitting type;
determining a value of a variable by comparing the depth of the current split node with a maximum delta Quantization Parameter (QP) signaling depth;
deriving a delta QP from one or more syntax elements signaled or parsed in a Transform Unit (TU) associated with the current split node according to the value of the variable;
reconstructing a final QP for one or more TUs associated with the current split node based on a reference QP and the delta QP when the one or more syntax elements are signaled or parsed for the current split node; and
decoding the one or more TUs associated with the current split node using the final QP.

22. A non-transitory computer readable medium storing program instructions causing a processing circuit of an apparatus to perform a video processing method, and the method comprising:
receiving input data associated with a current split node, wherein the current split node is partitioned from a parent node by a splitting type;
determining a depth of the current split node according to the splitting type;
determining a value of a variable by comparing the depth of the current split node with a maximum delta Quantization Parameter (QP) signaling depth;
deriving a delta QP from one or more syntax elements signaled or parsed in a Transform Unit (TU) associated with the current split node according to the value of the variable;
reconstructing a final QP for one or more TUs associated with the current split node based on a reference QP and the delta QP when the one or more syntax elements are signaled or parsed for the current split node; and decoding the one or more TUs associated with the current split node using the final QP.

23. A method of processing video data in a video encoding system, wherein video data is partitioned into leaf Coding Units (CUs) according to a CU partitioning structure, the method comprising:
- receiving input data associated with a current split node, wherein the current split node is partitioned from a parent node by a splitting type;
- determining a depth of the current split node according to the splitting type;
- determining a Quantization Parameter (QP) for the current split node according to a comparing result of the depth of the current split node and a maximum delta QP signaling depth;
- deriving a delta QP from the QP for the current split node and a reference QP and signaling one or more syntax elements of the delta QP in a Transform Unit (TU) associated with the current split node; and
- encoding one or more TUs of the current split node using the QP.

24. An apparatus of processing video data in a video encoding system, wherein video data is partitioned into leaf Coding Units (CUs) according to one or more CU partitioning structures, the apparatus comprising one or more electronic circuits configured for:
- receiving input data associated with a current split node, wherein the current split node is partitioned from a parent node by a splitting type;
- determining a depth of the current split node according to the splitting type;
- determining a Quantization Parameter (QP) for the current split node according to a comparing result of the depth of the current split node and a maximum delta QP signaling depth;
- deriving a delta QP according to the QP for the current split node and a reference QP and signaling one or more syntax elements of the delta QP in a Transform Unit (TU) associated with the current split node; and
- encoding one or more TUs of the current split node according to the QP.

25. A non-transitory computer readable medium storing program instruction instructions causing a processing circuit of an apparatus to perform a video processing method, the method comprising:
- receiving input data associated with a current split node, wherein the current split node is partitioned from a parent node by a splitting type;
- determining a depth of the current split node according to the splitting type;
- determining a Quantization Parameter (QP) for the current split node according to a comparing result of the depth of the current split node and a maximum delta QP signaling depth;
- deriving a delta QP according to the QP for the current split node and a reference QP and signaling one or more syntax elements of the delta QP in a Transform Unit (TU) associated with the current split node; and
- encoding one or more TUs of the current split node according to the QP.

* * * * *